(12) United States Patent
Heilek et al.

(10) Patent No.: US 8,217,198 B2
(45) Date of Patent: Jul. 10, 2012

(54) PROCESS FOR PURIFYING REMOVAL OF A CHEMICAL TARGET COMPOUND FROM A SUSPENSION OF CRYSTALS THEREOF IN MOTHER LIQUOR

(75) Inventors: Joerg Heilek, Bammental (DE); Wolfgang Schneider, Bad Duerkheim (DE); Wolfgang Gunkel, Mannheim (DE); Volker Schliephake, Schifferstadt (DE); Klaus Joachim Mueller-Engel, Stutensee (DE)

(73) Assignee: BASF SE, Ludwigshafen (DE)

( * ) Notice: Subject to any disclaimer, the term of this patent is extended or adjusted under 35 U.S.C. 154(b) by 299 days.

(21) Appl. No.: 12/706,367

(22) Filed: Feb. 16, 2010

(65) Prior Publication Data

US 2010/0206821 A1 Aug. 19, 2010

Related U.S. Application Data

(60) Provisional application No. 61/153,339, filed on Feb. 18, 2009.

(30) Foreign Application Priority Data

Feb. 18, 2009 (DE) .......................... 10 2009 000 987

(51) Int. Cl.
*C07C 51/42* (2006.01)
(52) U.S. Cl. .......................... 562/600; 560/598; 210/296
(58) Field of Classification Search .......................... None
See application file for complete search history.

(56) References Cited

U.S. PATENT DOCUMENTS

| 4,787,985 A | 11/1988 | Roodenrijs et al. | |
| 5,102,544 A * | 4/1992 | Roodenrijs | .................. 210/296 |

FOREIGN PATENT DOCUMENTS

| DE | 100 36 881 A1 | 2/2002 |
| DE | 102 28 859 A1 | 1/2004 |
| DE | 10 2005 003 115 A1 | 8/2006 |
| DE | 10 2005 018 702 A1 | 10/2006 |
| DE | 10 2007 004 960 A1 | 7/2008 |
| DE | 10 2007 043 748 A1 | 9/2008 |
| DE | 10 2007 043 759 A1 | 9/2008 |
| DE | 10 2007 043 758 A1 | 10/2008 |
| DE | 10 2007 028 332 A1 | 12/2008 |
| DE | 10 2007 028 333 A1 | 12/2008 |
| EP | 0 373 720 A1 | 6/1990 |
| EP | 1 448 282 B1 | 8/2004 |
| WO | WO 01/77056 A1 | 10/2001 |
| WO | WO 02/09839 A1 | 2/2002 |
| WO | WO 02/055469 A1 | 7/2002 |
| WO | WO 03/041832 A1 | 5/2003 |
| WO | WO 03/041833 A1 | 5/2003 |
| WO | WO 03/078378 A1 | 9/2003 |
| WO | WO 2004/035514 A1 | 4/2004 |
| WO | WO 2006/111565 A2 | 10/2006 |
| WO | WO 2009/148314 A1 | 12/2009 |

OTHER PUBLICATIONS

U.S. Appl. No. 12/897,199, filed Oct. 4, 2010, Heilek, et al.
Siegbert Rittner et al., "Die Schmelzkristallisation von organischen Stoffen und ihre großtechnische Anwendung", Chemie Ingenieur Technik, vol. 57, No. 2, 1985, pp. 91-102.
P. J. Jansens et al., "The Purification Process in Hydraulic Packed-Bed Wash Columns", Chemical Engineering Science, vol. 50, No. 17, 1995, pp. 2717-2729.
D. Verdoes et al., "Improved procedures for Separating Crystals from the Melt", Applied Thermal Engineering, vol. 17, Nos. 8-10, 1997, pp. 879-888.
Dr. -Ing E. Mayer, "Berechnung und Konstruktion von axialen Gleitringdichtungen", Konstruktion, vol. 20, No. 6, 1968, p. 213-219.

* cited by examiner

*Primary Examiner* — Sudhakar Katakam
(74) *Attorney, Agent, or Firm* — Oblon, Spivak, McClelland, Maier & Neustadt, L.L.P.

(57) ABSTRACT

A process for purifying removal of a chemical target compound from a suspension of crystals thereof in mother liquor in a wash column with forced transport of the crystal bed from the top downward, in which crystals are removed from the lower end of the crystal bed with a rotating removal device and melted, and a portion of the crystal melt is conducted back toward the crystal bed as wash melt, the removal device being secured with a drive shaft conducted into the wash column from the bottom through an inlet having a seal, said drive shaft being driven about its longitudinal axis by a drive unit for rotation and being mounted so as to be rotatable about its longitudinal axis in more than one bearing, such that the mounting in one of the bearings absorbs the downward force acting on the drive shaft, the mounting in two or more bearings absorbs forces acting radially outward from the drive shaft, and the mounting in one bearing is additionally capable of absorbing an upward force acting on the drive shaft.

21 Claims, 9 Drawing Sheets

PROCESS FOR PURIFYING REMOVAL OF A CHEMICAL TARGET COMPOUND FROM A SUSPENSION OF CRYSTALS THEREOF IN MOTHER LIQUOR

The present invention relates to a process for purifying removal of a chemical target compound from a suspension of crystals thereof in mother liquor with a wash apparatus which comprises, as at least one element, a wash column which consists of various components and has, as a first component, a fixed wall which encloses a process space which is rotationally symmetric with respect to its longitudinal axis and a crystal melt space which adjoins said process space, the angle α formed between the three-dimensional direction of the axis of symmetry and the vertical being not more than 20°, and the process space being delimited by the wall of the wash column and two opposite ends on the axis of symmetry, of which the higher end on the axis of symmetry constitutes the feed end and the lower end on the axis of symmetry the removal end, in which

- at the feed end, a stream of the suspension is conducted into the process space,
- while retaining the crystals to form a crystal bed in the process space from the suspension stream conducted into the process space, a mother liquor stream is released from the process space,
- as a further component of the wash column, a removal device rotates therein at the removal end of the process space,
- the crystal bed is conveyed within the process space with at least one force other than gravity and parallel to the axis of symmetry of the process space toward the rotating removal device to meet the removal device,
- the rotating removal device removes crystals from the crystal bed which meets it,
- the stream of the crystals removed flows through the rotating removal device and/or past the rotating removal device into the crystal melt space, which adjoins the process space beyond the removal device in conveying direction of the crystal bed, of the wash column,
- as a further component of the wash column, a drive shaft which is driven about its longitudinal axis by a drive unit for rotation is conducted into the wash column from below through an inlet leading into the crystal melt space, the angle β formed between the three-dimensional direction of the axis of rotation of the drive shaft and the three-dimensional direction of the axis of symmetry of the process space not being more than 20° in any projection of the two three-dimensional directions into one plane,
- the removal device is secured on the drive shaft and the rotating drive shaft transmits the torque required for the rotation of the removal device thereto,
- the crystal stream conducted into the crystal melt space is melted in the crystal melt space and/or in a melt circuit conducted through the crystal melt space by introducing heat to give a crystal melt stream,
- the inlet for the drive shaft into the crystal melt space is equipped with a seal which counteracts the unintended exit of crystal melt from the crystal melt space through the inlet into it,
- based on the strength of the aforementioned crystal melt stream, proceeding from the crystal melt space, a substream of crystal melt, as a wash melt stream, is conducted through the rotating removal device and/or past the rotating removal device against the direction of movement of the crystal bed into the process space so as to form, in the crystal bed, a wash front which divides the crystal bed into a mother liquor zone and into a wash melt zone, and the remaining substream is sent to its outlet as a pure melt stream of the chemical target compound,
- the force which acts on the drive shaft in the longitudinal direction thereof in normal operation of the process is always directed downward,
- the drive shaft is mounted so as to be rotatable about its longitudinal axis in more than one bearing,
- the mounting in one of the bearings is configured such that the mounting in this bearing absorbs the downward force acting on the drive shaft in the longitudinal direction thereof, and
- the mounting in at least two bearings is configured such that the mounting in each of these two bearings absorbs the forces acting radially outward from the drive shaft in the particular bearing of the two bearings.

In particular, the present invention relates to processes for purifying removal of a chemical target compound from a suspension of crystals thereof in mother liquor with a wash apparatus whose wash column is a hydraulic wash column, as described in documents WO 2009/148314, WO 01/77056, WO 04/35514, WO 03/41833, WO 02/9839, WO 03/41832, DE-A 100 36 881, WO 02/55469, WO 03/78378, DE-A 10 2005 018 702, WO 01/77056, German application 102007032633.7 and EP-A1 448 282. This is the case in particular when the process is one for purifying removal of acrylic acid from a suspension of acrylic acid crystals in contaminated acrylic acid melt, (i.e. when acrylic acid is the chemical target compound).

Acrylic acid, either itself or in the form of its salts or its esters, is of significance especially for preparation of polymers for a wide variety of different fields of use (for example adhesives, superabsorbents, binders).

The numerical addresses in this document are always based on the figures appended to this document.

The term "mother liquor" shall be understood in this document such that it comprises both melts (a proportion by weight therein of ≧50% by weight is accounted for by the target compound) of the chemical target compound to be purified comprising impurities, and solutions of the chemical target compound to be purified, with or without impurities, in solvents or solvent mixtures (a proportion by weight therein of <50% by weight is accounted for by the target compound), with the proviso that, when they are cooled (i.e. when the mother liquor is cooled), the chemical target compound crystallizes.

The process according to the preamble of this document is known from EP-A 1 448 282. It generally follows a process for suspension crystallization. In the synthesis of a chemical target compound, it is typically not obtained as a pure product, but is generally part of a substance mixture which, as well as the target compound desired in high purity, also comprises undesired constituents such as solvents, starting compounds and by-products (e.g. isomers).

When such a reaction product mixture present in its liquid state is cooled, thus bringing about the formation of crystals of the desired chemical target compound, suspension crystallization is a very effective and inexpensive process for removing a chemical target compound from the reaction product mixture in high purity. This makes use of the fact that, when crystals formed from the chemical target compound grow, constituents which are present in a liquid and are different from the chemical target compound are generally substantially displaced from the crystal lattice and remain in the mother liquor. Frequently, even in a one-stage crystallization process, high-purity crystals of the desired chemical target compound are obtained. If required, the suspension crystallization can be performed in a plurality of stages. Frequently, the reaction product mixture obtained directly in the synthesis, by employing thermal separating processes other than crystallization (for example rectification, extraction, stripping, distillation, desorption and/or absorption), will also first be converted to another substance mixture comprising the chemical target compound, to which the method of removal of the chemical target compound by suspension crystallization can then be applied particularly advantageously, or only then.

The process of suspension crystallization is known (cf., for example, DE-A 10 2007 043 758, DE-A 10 2007 043 748, DE-A 10 2007 004 960, DE-A 10 2007 043 759 and DE-A 10 2007 043 758 and the literature cited in these documents). Appropriately in application terms, it is performed with the aid of an indirect heat exchanger (cooler or crystallizer) having a secondary space and at least one primary space.

The transfer of heat from the liquid substance mixture which comprises the chemical target compound and is supplied to the secondary space through the material dividing wall (the heat transfer surface) which divides the secondary space and the at least one primary space from one another into a coolant flowing within the at least one primary space cools the liquid substance mixture until its saturation limit with the chemical target compound is exceeded, and the substance mixture counteracts oversaturation by forming (by depositing) crystals formed from the chemical target compound.

When the desired degree of crystallization (the term "degree of crystallization" here means the fraction by mass or else proportion by mass of the fine crystals present in the resulting suspension of crystals of the chemical target compound in remaining (liquid) mother liquor in the total mass of the crystal suspension) has been attained, the crystal suspension is conducted out of the secondary space. Removal of the crystals from the mother liquor allows the desired chemical target compound to be obtained in high purity. A crucial step which has a crucial influence on the purity of the chemical target compound removed is the separation process employed for the removal of the crystals from the mother liquor which comprises constituents other than the chemical target compound in enriched form, and the as yet uncrystallized proportions of the chemical target compound. This separating process can proceed in a plurality of stages, in which case a so-called wash column removal is often employed at least in the last stage.

The wash column removal may, however, also constitute the only separation stage. It has the task of separating the contaminated mother liquor as quantitatively as possible from the crystals.

Wash columns are known from the prior art documents already cited in this document. They comprise a process space which is normally rotationally symmetric with respect to its longitudinal axis and is delimited by the wall of the wash column and two opposite ends on the axis of symmetry, the angle α formed between the three-dimensional direction of the axis of symmetry and the vertical normally being not more than 20°. α is preferably very small or zero.

A distributor space may be arranged upstream of the process space. Instead of feeding the crystal suspension directly to the process space at one of its two ends, it can first also be supplied to the distributor space upstream thereof (cf. FIG. 4). By virtue of the path leading through the distributor space into the process space, the crystal suspension is fed to the latter distributed particularly homogeneously over the cross section of the feed end of the process space.

In the process space, mother liquor withdrawal generates a denser crystal bed and conveys it through the process space to the opposite end thereof. In principle, different methods are useful for forming the crystal bed. In the case of wash columns which work by gravity, the crystal suspension is necessarily fed to the process space at the upper end. The crystal bed forms in a sedimentation process and it is conveyed in the conveying direction by the sole action of gravity. The mother liquor is normally removed from the process space by overflow. When it reaches the lower end of the process space, the crystals are melted. A portion of the crystal melt stream which is formed and has a lower apparent density compared to the solid crystals flows, following the density difference, upward in the crystal bed against the conveying of the crystal bed, and the remaining portion is sent to its outlet as a pure melt stream of the chemical target compound. Since vertical channels can form in the course of sedimentation in the crystal bed, along which there may be undesired backmixing, wash columns which work by gravity are provided at least over part of their height with a stirrer which counteracts formation of such channels.

The use of wash columns which work by gravity (gravimetric wash columns) is excluded from the process according to the invention, since neither does a defined wash front form therein nor is a rotating removal device used therein.

The process according to the invention is accordingly restricted to processes in which wash columns with so-called forced conveying of the crystal bed (comprehensive description of the different wash column types can be found, among other documents, in Chem.-Ing. Techn. 57 (1985) No. 291-102, in Chemical Engineering Science vol. 50, No. 17, p. 2712 to 2729, 1995, Elsevier Science Ltd., in Applied Thermal Engineering vol. 17, No. 8-10, p. 879-888, 1997, Verlag Elsevier Science Ltd., and in the literature citations listed in the aforementioned references) are used.

Wash columns with forced transport (or forced conveying) of the crystal bed are characterized in that a conveying force other than gravity acts in the conveying direction (or transport direction) of the crystal bed.

In principle, in wash columns with forced conveying, the crystal suspension can therefore be fed to the process space either at the upper end thereof or at the lower end thereof, and the crystal bed which forms can thus be conveyed either from the top downward or from the bottom upward. In general, the crystal bed in wash columns with forced transport is not stirred (if it is stirred, this is with very substantial avoidance of axial mixing). For reasons of appropriateness in terms of application, the process according to the invention is restricted to processes in wash columns with forced conveying of the crystal bed within the process space from the top downward, in which the crystal suspension is fed to the process space at the upper end thereof (if appropriate via a distributor space upstream thereof).

Wash columns with forced conveying of the crystal bed can be divided into two groups of wash columns: hydraulic wash columns and mechanical wash columns. In hydraulic wash columns, the crystal suspension is conveyed, for example, by means of pumps and/or hydrostatic head into a wash column under pressure.

The liquid flow imposed by the feed pressure (i.e. the conveying pressure in conjunction with the removal of mother liquor) then ensures compaction of the crystals to give the crystal bed, and the conveying thereof (the hydraulic pressure (the pressure exerted by the moving liquid or the pressure drop which results until it is released from the process space) is typically 0.1 to 10 bar, frequently 1 to 5 bar).

The mother liquor normally flows out of the hydraulic wash column through filters (which may be present, for example, in filter tubes which run from the top downward within the process space, in the lower region thereof, and/or in the wash column wall which encloses the process space, in the lower region of said process space) (beyond the filters, there may be standard pressure, reduced pressure or superatmospheric pressure). The recycling of a portion of the mother liquor removed from the process space at the feed end and/or the supply of another control liquid with the crystal suspension enables the regulation of the transport force (of the control flow). A comprehensive description of hydraulic wash columns and the mode of operation thereof is disclosed by WO 2006/111565. FIGS. 1 and 4 of the present application show illustrative embodiments of a hydraulic wash column.

BRIEF DESCRIPTION OF THE SEVERAL VIEWS OF THE DRAWINGS

In a mechanical wash column, the pressure (the process space therein also has an elevated pressure) to form and convey the crystal bed within the process space of the wash column is generated by a mechanical forced conveying device (wash column with mechanical conveying). In the simplest case, this may be a semipermeable plunger which is permeable to the mother liquor and is impermeable to the crystals of the suspension supplied (cf. FIG. 2), and whose periodic upward and downward motion generates the pressure to compact and convey the crystal bed. The mechanical compaction to a crystal bed and the conveying thereof can, however, also be effected by removing the mother liquor through filters and mechanically transporting the crystals from the filter to the crystal bed with the aid of a rotating conveying element (for example a screw, a stirrer, a helix or spirals). The filters may be integrated into the rotating conveying elements or be mounted at the opposite end (FIG. 3) of the process space to the conveying direction.

Figure 1:
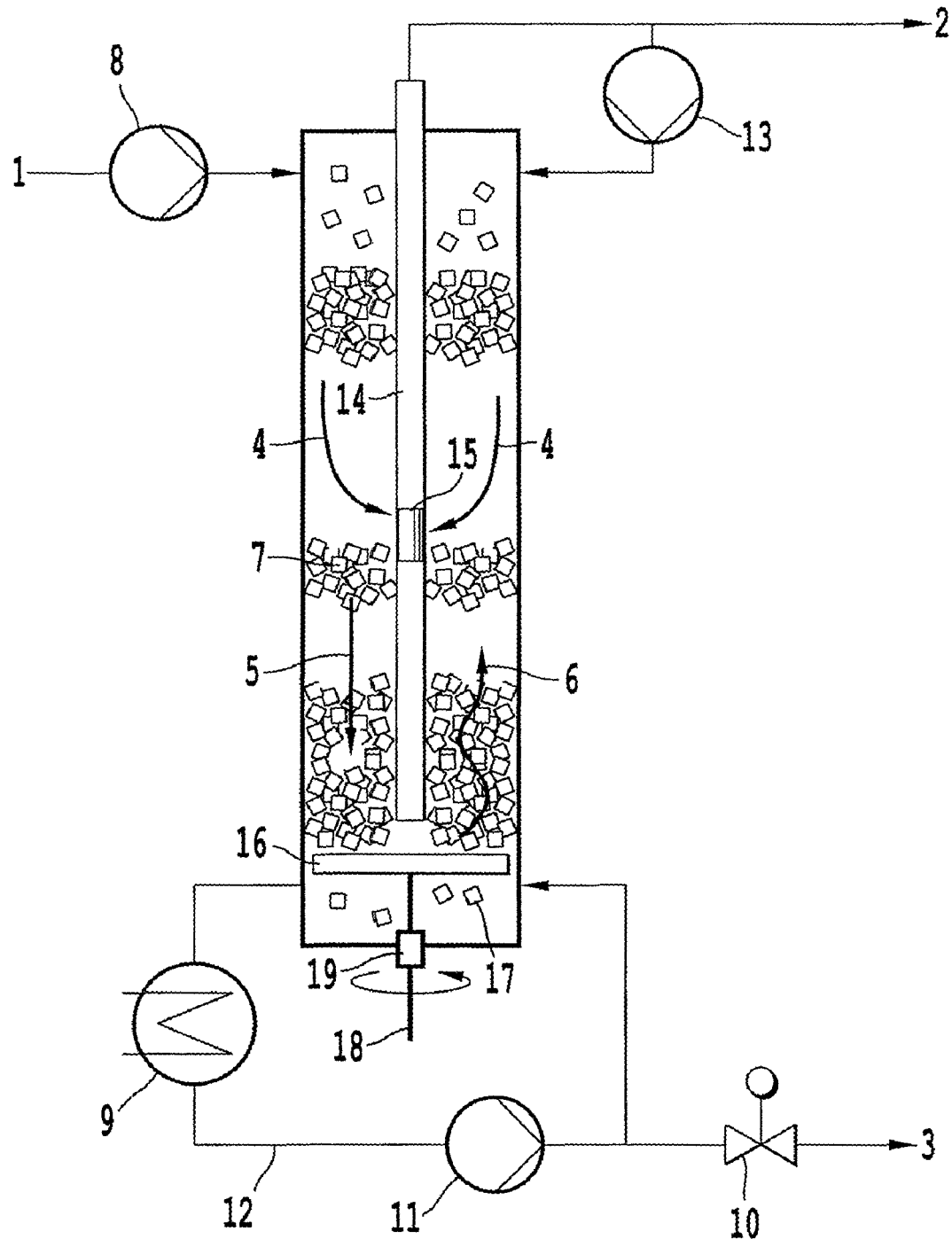
FIG. 1 shows a diagram in longitudinal section of the principle of function of a hydraulic wash column without a distributor space.

In wash columns with forced transport of the crystal bed, the crystal bed has, in the process space, a so-called buildup front at which crystals of the crystal suspension introduced add on continuously. The buildup front thus refers to the transition from the crystal suspension to the crystal bed and is characterized by a relatively abrupt rise in the crystal content per unit volume. In the process according to the invention, the buildup front is necessarily within the upper region of the process space.

At the opposite end of the crystal bed to the buildup front, which is at the lower end of the process space in the process according to the invention, is mounted, in the case of wash columns with forced transport of the crystal bed, appropriately in application terms, a removal device which rotates within the wash column. This may be, for example, a circular disk which has passage orifices and is equipped with blades (for example, each passage orifice may be equipped with a blade).

The rotating bladed disk (the rotating removal device) removes, from the crystal bed which is conveyed toward the rotating bladed disk (toward the rotating removal device), at the end thereof which meets it, continuously or at time intervals, a stream of crystals which flows through the passage orifices of the bladed disk into the crystal melt space, which adjoins the process space in conveying direction of the crystal bed beyond the rotating bladed (removal) disk (removal device), of the wash column.

Instead of a bladed disk having passage orifices, the rotating removal device may also be a single rotating removal blade (if appropriate incorporated into a shaft (held by a shaft)). In this case, the crystal flow removed by the rotating removal blade flows past it into the crystal melt space. In both cases, both in the case of the rotating bladed disk and in the case of the rotating single blade, the rotation body described by the rotating removal device separates process space and crystal melt space from one another. It will be appreciated that useful rotating removal devices are also any intermediate form between a bladed disk having circular passage orifices and a rotating single blade, as detailed also, for example, in WO 2009/148314. In principle, however, the geometry of the disk may be as desired.

The axis of rotation of the removal device (the axis of rotation of its drive shaft) and the axis of symmetry of the rotationally symmetric process space preferably coincide. However, the two axes may also be offset laterally with respect to one another to a limited degree (based on the mean (averaged over its height) diameter of the process space, by up to 20% thereof (preferably by not more than 10%, or by not more than 5% thereof)). Normally, the angle $\beta$ formed between the three-dimensional direction of the axis of rotation of the drive shaft and the three-dimensional direction of the axis of symmetry of the process space is, however, not more than 20° in any projection of the two three-dimensional directions into one plane. The angle $\beta$ is preferably small and more preferably vanishingly small.

The torque required for the rotation of the removal device is transmitted to it by a drive shaft which rotates about its longitudinal axis, to which the removal device is secured. The drive shaft itself is conducted into the wash column from below through an inlet which is in the wash column wall and leads into the crystal melt space. The drive shaft may in principle extend into the wash column only up to the removal device, or else project into the process space or even beyond it. The drive shaft itself is driven about its longitudinal axis by a drive unit for rotation. This drive unit is preferably a motor, more preferably an electric motor (including transmission and clutch system). In principle, however, a turbine or a hydraulic drive can also be employed. The drive unit is normally outside the wash column and its weight typically does not act on the drive shaft.

The stream of crystals which is removed from the lower end of the crystal bed by the removal device and flows into the crystal melt space (the rotation and with it the removal may be either continuous or at time intervals) is melted by introduction of heat to give a crystal melt stream. In the case of wash columns with forced conveying of the crystal bed, as are to be used in accordance with the invention, this heat can be introduced, in a first embodiment, within the crystal melt space itself (for example via appropriate apparatus incorporated into the crystal melt space, such as heating coils or electrical heating spirals). Based on the strength of the resulting crystal melt stream, only a substream is then withdrawn from the crystal melt space via an outlet as a pure melt stream. The residual stream which remains in the crystal melt space, owing to its lower specific mass compared to the crystals, ascends proceeding from the crystal melt space and flows through the rotating removal device and/or past the rotating removal device as a wash melt stream against the direction of movement of the crystal bed in the process space from the bottom upward.

In a second embodiment, the crystals removed can, however, also be suspended only in crystal melt already obtained beforehand in the crystal melt space. This suspension is then conducted out of the crystal melt space and back into it by means of a melt circulation pump in a melt circuit, which is capable of retaining a greater reservoir of crystal melt than the crystal melt space alone, via a melter (for example a heat exchanger) which, by an indirect (preferred) or direct route, introduces the heat required to melt the crystals into the melt circuit. It will be appreciated that both embodiments can, however, also be employed in combination.

The second embodiment is advantageous especially in the case of thermally sensitive chemical target compounds, for example acrylic acid, since the relatively large crystal melt reservoir (the crystal melt circulation stream in the melt circuit is advantageously 2 to 30 and usually 5 to 20 m$^3$/h per m$^3$/h of the stream of crystals removed (calculated in molten form); in other words, the melt circuit normally has a low content of as yet unmelted removed crystals, which promotes its and their conveying) of the melt circuit causes an increased heat capacity, and as a result experiences a smaller temperature change with the same introduction of heat, or is capable of providing a larger amount of heat to melt the crystals suspended therein at the same temperature. Based on the crystal melt stream generated in the melt circuit from the crystal stream removed, a substream is supplied to its outlet from the melt circuit as a pure melt stream of the chemical target compound, while the remaining substream, as a result of the pressure, proceeding from the crystal melt stream, is conducted into the process space as a wash melt stream through the rotating removal device and/or past the rotating removal device against the direction of movement of the crystal bed. The adjustment of the strength of the pure melt stream discharged can, in the process according to the invention, in principle be undertaken by means of an outlet valve. The crystal melt in the crystal melt space normally has melting point temperature (typically, this is exceeded in the crystal melt space by not more than 5° C., preferably by not more than 3 or 2° C. and more preferably by not more than 1° C.).

In effect, the wash melt streaming in the opposite direction to the conveying direction of the crystal bed virtually forces the crystal bed saturated with mother liquor into the wash melt streaming upward within the process space, and, as a washing effect, simply pushes the mother liquor back within the crystal bed to a limited degree. In other words, with appropriate adjustment of the wash melt stream to the boundary conditions of the removal process, a steady state is established, wherein a so-called wash front is established at a defined height of the crystal bed. It is defined as that height in the process space at which the highest temperature and concentration gradients occur as a function of the process space height. Above and below the wash front, the height-dependent temperatures (concentrations) comparatively rapidly (generally within a height change (referred to as wash front range), of less than ±5 cm) reach a value which no longer changes as a function of height.

This value is, in the region above the wash front, the temperature (the corresponding concentration) of the crystal suspension fed to the process space and, in the region below the wash front, the melting point temperature (the corresponding concentration) of the wash melt. The height position of the wash front can be varied to a limited degree by regulating the ratio of crystal mass flow conveyed to wash melt stream conveyed in the opposite direction. The height section within the process space from the wash front to the buildup front is referred to as mother liquor zone, and the height range from the wash front up to the end of the crystal bed facing away from the buildup front is referred to as the pure melt zone. Below a particular minimum length of the wash melt zone, the washing action improves with increasing length of the wash melt zone.

The temperature $T^{SP}$ with which the crystal suspension is fed to the process space corresponds generally essentially to that temperature with which the suspension has been conducted out of the suspension crystallizer (cf. DE-A 102007043759). Since the crystallization temperature in the mother liquor of the suspension, which comprises enriched constituents other than the chemical target compound, is necessarily below the melting point $T^{SCH}$ of the wash melt (the withdrawn pure melt) (for reference see "freezing point depression"), $T^{SP}$ is normally less than $T^{SCH}$. Within the wash front region, when the crystals which flow in from above at a comparatively cold temperature meet the wash melt which flows in from below at a comparatively warm temperature, there is therefore a heat flow flowing away from the wash melt toward the crystals, as a result of which the wash melt in the wash front region recrystallizes partially to completely depending on the magnitude of the difference $T^{SCH}-T^{SP}$. As a result, at least a substream of the wash melt stream is firstly recovered. The other substream (which in favorable cases is vanishingly small and whose strength is generally ≦30% based on that of the wash melt stream) leaves the process space of the wash column together with mother liquor removed therefrom. Since recrystallization constitutes a further purification mechanism of the purifying wash column removal process, it appears appropriate at first glance to conduct the suspension crystallization up to a degree of crystallization which causes a maximum difference $T^{SCH}-T^{SP}$.

However, with an increasing $\Delta T^S = T^{SCH} - T^{SP}$ the porosity of the crystal bed conveyed toward the removal device also decreases, which reduces the permeability thereof to the wash melt ascending within the process space and increases both the conveying pressure required for the wash melt and the opposing conveying pressure required for the crystal bed conveying. This would reduce the attractiveness of the process for reasons relating to energy balance. Values of $\Delta T^S$ employed in normal operation are therefore typically 1 to 25° C., frequently 2 to 20° C., or 5 to 15° C.

The cross section of the process space is frequently constant over its length. In general, however, it is advantageous to increase it from the top downward just before the rotating removal device (by 5 to 100 mm based on its diameter). This enables the radial dimension of the removal device to be selected somewhat greater than the radial dimension of the crystal bed (however, it may also be smaller than the latter in principle), which promotes the homogeneous removal of crystals over the entire crystal bed cross section (cf. EP-A 1 448 282). To improve the suspension of the crystals removed by the rotating removal device within the crystal melt present in the crystal melt space, it is helpful to secure paddles to the drive shaft for the removal device below said removal device, which mix the crystal melt space. This purpose can also be served by reinforcing elements which are configured with a large area between the hub used to secure the removal device on the shaft and the removal device, and baffles secured on the inner wall of the crystal melt space (for both elements, see FIG. 2 of EP-A 1 448 282).

The inlet for the drive shaft into the crystal melt space is equipped with a seal which counteracts the unintended exit of crystal melt from the crystal melt space (the crystal melt is present under pressure therein) through the inlet. Useful such seals include, for example, slip ring seals, stuffing boxes or lip ring seals.

Especially in the case of acrylic acid as the chemical target compound, the use of double-action axial slip ring seals is advantageous, which are, for example, also detailed in DE-A 102 28 859 and DE-A 10 2005 003 115. The inlet into the crystal melt space is configured as an inlet space which has two opposite outlets on the longitudinal axis of the drive shaft. The upper outlet constitutes the actual inlet for the drive shaft into the crystal melt space and the lower outlet constitutes the inlet for the drive shaft into the inlet space. Slide elements (slip rings) which are joined firmly and impermeably to the drive shaft toward both outlets slide on a mating ring mounted in a fixed manner in the particular outlet. A spring normally forces the slip ring against the mating ring with a pretension of 1 to 2 bar. In each case, slip ring and mating ring form a slip ring pair.

In addition, the inlet space (barrier space) is filled with a barrier fluid which is under a higher pressure than the crystal melt in the crystal melt space. The elevated pressure of the barrier fluid compared to the pressure existing in the crystal melt space prevents crystal melt from emerging from the crystal melt space. Owing to elevated pressure in the barrier space a marginal leakage stream flows into the crystal melt space. The leakage rate is compensated continuously from reservoir vessels. In this way, no crystal melt gets to the slip face between the upper pair of slip ring and mating ring (the lubrication film is formed by the barrier fluid), and, for example, undesired free-radical polymerization of acrylic acid melt initiated by frictional heat is thus counteracted. In the case of acrylic acid as the chemical target compound, suitable barrier fluids include ethylene glycol and water, and mixtures thereof. Particular preference is given to those mixtures whose ethylene glycol content is 10 to 70% by weight, advantageously 20 to 40% by weight or 25 to 35% by weight. Typical leakage rates are less than 1 l/h, preferably less than 0.5 l/h and more preferably less than 0.1 l/h at pure melt discharge rates of 0.5 to 20 $m^3$/h. Further details of the calculation and construction of double-action axial slip ring seals can be found in E. Mayer, "Berechnung and Konstruktion von axialen Gleitringdichtungen" [Calculation and Construction of Axial Slip Ring Seals], Konstruktion 20, page 213 to 319 (1968). Useful materials for slip ring and mating ring include a series of different materials. These include graphite, silicon carbide, aluminum oxide, tungsten carbide, stainless steel, cast chromium steel, polytetrafluoroethylene and specialty materials.

In the case of acrylic acid as the chemical target compound, SiC is the preferred material. Tungsten carbide is a suitable alternative.

The sealing of the slip ring sealing elements against the drive shaft and the inlet housing is generally effected with secondary seals.

Moreover, especially in the case of acrylic acid as the chemical target compound, the upper slip ring pair is preferably in the open in the crystal melt, such that good external rinsing with crystal melt can proceed in the region of this slip ring pair. This configuration of the slip ring seal is preferred over an embodiment with a recessed construction, in which the slip rings in contact with the crystal melt are within a narrow cylindrical cavity, since the good rinsing ensures excellent cooling of the slip rings.

The material used for the wall of the wash column (the shell of the process space) may, for example, be metal, which may be of a wide variety of different types according to the chemical target compound to be removed in a purifying manner. For example, the metals may be pure metals, or else alloys, for example carbon steels, iron-base alloys (stainless steel, e.g. with Cr/Ni addition) or nickel-base alloys (e.g. Hastelloy qualities).

When the chemical target compound is acrylic acid, a preferred wall material of the wash column is stainless steel, especially stainless steel of DIN materials No. 1.4571 or 1.4541, or stainless steel which is similar to these stainless steels with regard to the alloy elements present therein. The thickness of the metal wall which delimits the process space is appropriately 3 to 30 mm, frequently 4 to 20 mm and usually 5 to 15 mm. The latter is especially true in the case of stainless steel.

Advantageously in application terms, the wash column wall is thermally insulated as described in German application No. 102008040340.7 or trace-heated as recommended in WO 03/041832.

The fixing of the wall of the wash column (the wash column body) can be accomplished in different ways. In the simplest manner, for example, three or more legs may be secured on the wash column wall. Alternatively, a support ring running around its circumference may be secured to the wall of the wash column in the lower region. With this, it is then possible to place the wash column on the edge of a suitable recess. The body of the wash column can also be held by a holder which is itself fixed to a holding post.

As already mentioned, the upper end of the process space need not necessarily coincide with the upper end of the wash column. Instead, above the process space, there may be a distributor space, proceeding from which the crystal suspension is distributed homogeneously over the cross section of the upper end of the process space by means of a distributor tray which separates the distributor space from the process space (cf., for example, EP-A 1 448 282).

To ensure reliable and stable operation of a wash column separation process to be performed as described, EP-A 1 448 282 recommends mounting the drive shaft so as to be rotatable about its longitudinal axis in more than one bearing.

In this case, the mounting pursues the aim of very substantially frictionless rotation of the drive shaft about its longitudinal axis, and the maintenance of a fixed position, apart from its intended rotational movement, of the removal device in the space. In order to achieve this aim, the mounting should in principle be configured such that it takes account of all forces considered possible in longitudinal direction of the drive shaft and at right angles thereto in the different operating states. In this document, the term "force" always means the overall total force resulting from different individual force contributions, or components thereof acting in selected three-dimensional directions.

Just like the present application, the general case of processes for removing a chemical target compound from a suspension of crystals thereof in mother liquor to be performed as described with a crystal bed conveyed from the top downward in the wash column is restricted to processes in which, in normal separating operation, the force acting on the drive shaft in the longitudinal direction thereof is directed downward (away from the conveyed crystal bed).

One reason for this is that, in the general case, the dominant contribution to the force acting on the drive shaft in the longitudinal direction of the drive shaft, in separating process operation, is the weight GM of the total mass of the drive shaft and of all corotating components secured to it in the wash column, including the removal device (whose effect is of course reduced by the Archimedean buoyancy).

The latter is the case not least when the aforementioned weight GM is at least 3 kN, or at least 5 kN, or at least 8 kN, or at least 10 kN, or at least 13 kN. In general, the weight GM will not be more than 50 kN, usually not more than 40 kN and in some cases not more than 30 kN. This is true in particular when the removal device, or the removal device and the drive shaft, or the removal device, the drive shaft and other components connected in a fixed manner to the drive shaft, are manufactured from materials whose specific mass (whose density) is $\geq 3$ g/cm$^3$, or $\geq 5$ g/cm$^3$, or $\geq 7$ g/cm$^3$ (based on 25° C. and 1 atm), and the density of the crystal melt in the crystal melt space and of the mother liquor and crystal suspension in the process space is simultaneously $\leq 1.5$ g/cm$^3$ or even $\leq 1.3$ or $\leq 1.1$ g/cm$^3$ (it is normally $\geq 0.7$ g/cm$^3$). In general, the aforementioned material density is $\leq 18$ g/cm$^3$.

Since the conveying direction of the crystal bed in the wash column removal processes relevant for this application is deliberately directed toward the removal apparatus, the above-addressed contribution of the weight GM in the different expected operating states is enhanced by an additional force contribution directed from the top downward, which acts on the removal device. It would appear that the force contributions directed from the bottom upward which have to be taken into account are merely those of a comparatively negligible magnitude.

One of these is the force contribution resulting from the pressure drop $\Delta P^W$ of the wash melt as it passes through the removal device. It must necessarily be comparatively small, since not just the wash melt has to be able to pass through the removal device from the bottom upward, but the crystal stream removed from the crystal bed by the removal device also has to be able to pass through the removal device from the top downward.

Since the same passages connecting the process space and the crystal melt space to one another through the removal device and/or past the removal device are available to the wash melt stream and the crystal stream for this purpose (the crystals must be able to flow downward against the ascending wash melt stream), the removal device has, appropriately in application terms, a comparatively large orifice ratio OV (in this document, this is understood to mean, based on the removal device in the non-rotating state, the ratio of the sum of the cross-sectional areas of the passages leading through the removal device and/or past the removal device to the cross-sectional area of the crystal bed at its end facing toward the removal device (when the cross-sectional area of the passage through the passage is not constant, the smallest cross-sectional area of the passage in each case should be used to form the sum)), which causes low $\Delta P^W$ values (in particular when it is considered that the wash melt mass flow cannot be greater in any operating state than the crystal mass flow conducted into the process space via the crystal suspension). Typically, OV in the wash column removal process to be performed as described is at least 0.05 or at least 0.1, or at least 0.2, frequently at least 0.3 and in many cases at least 0.5 or more (in some cases even at least 0.9). OV is naturally <1, usually $\leq 0.95$. In other words, it can be assumed that $\Delta P^W$ in all operating states is significantly below 20 mbar.

Another of these is a force contribution resulting from the fact that the area (what is meant is that area which runs from the blade edge to the blade back and faces toward the crystal bed when the removal device rotates) of the removal elements (removal blades) of the removal device and the axis of rotation of the drive shaft normally form an acute angle γ (γ is generally 20 to 70°, preferably 30 to 60°) (the removal device normally has, on its side facing toward the crystal bed, removal elements which project from the removal device to the end of the crystal bed facing toward the removal device). This has the effect that the crystal bed exerts, on the removal element which removes crystals from the crystal bed (and hence on the entire removal device), in the course of removal, a reaction force which has a force component directed upward in the axial direction of the drive shaft (directed toward the movement of the crystal bed) (for reference see "corkscrew principle"). The magnitude of this force contribution is considered to be minor for the different operating states of the wash column removal process being discussed, since it can be assumed that the inner deformability of the crystal bed is comparatively great (the individual crystals of the crystal bed are typically displaceable comparatively easily with respect to one another).

To ensure a very reliable and stable and frictionless wash column removal process with a crystal bed conveyed forcibly from the top downward, it should therefore be sufficient, against the background of the considerations conducted above and on the basis of EP-A 1 448 282, when the drive shaft is mounted rotatably about its longitudinal axis in more than one bearing, and the mounting in one of the bearings is performed such that the mounting in this bearing absorbs the downward force acting on the drive shaft in the longitudinal direction thereof and the mounting in at least two bearings is configured such that the mounting in each of these two bearings absorbs the forces acting radially outward from the drive shaft in the particular bearing of the two bearings.

In separating operation of a wash column equipped in this way with forced conveying of the crystal bed conducted from the top downward in the process space, however, unexpected and sudden problems occurred in the course of prolonged operating times. These consisted, for example, in that, when a double-action axial slip ring seal was employed for the inlet of the drive shaft into the crystal melt space, it suddenly became pervious after prolonged trouble-free operation. Detailed analyses of the operational disruption observed led to the surprising result that the downward force acting constantly on the drive shaft in the longitudinal direction thereof in normal operation of the process (based on the duration of an uninterrupted operating period (of, for example, at least 1 h, or at least 10 h, or at least 100 h) of the removal process, a period of more than 95% of the total duration), in unforeseeable and relatively improbably singular operating states, apparently at least briefly switched its direction from "directed downward" to "directed upward" (this is surprising not least because this requires force contributions whose sum exceeds by the sum of the force contributions directed downward). The upward force which acts temporarily as a result on the drive shaft in longitudinal direction thereof leads to an upward movement of the drive shaft and of the components secured thereto, which, from a degree depending on the detailed configuration of the wash apparatus, causes a wide variety of different damage and disruption.

It was therefore an object of the present invention to provide a process for purifying removal of a chemical target compound from a suspension of crystals thereof in mother liquor with a wash column with forced conveying of the crystal bed from the top downward therein, which still has the operating problems described to a reduced degree at most, if at all.

The object is achieved through provision of a process for purifying removal of a chemical target compound from a suspension of crystals thereof in mother liquor with a wash apparatus which comprises, as at least one element, a wash column which consists of various components and has, as a first component, a fixed wall which encloses a process space which is rotationally symmetric with respect to its longitudinal axis and a crystal melt space which adjoins said process space, the angle α formed between the three-dimensional direction of the axis of symmetry and the vertical being not more than 20°, and the process space being delimited by the wall of the wash column and two opposite ends on the axis of symmetry, of which the higher end on the axis of symmetry constitutes the feed end and the lower end on the axis of symmetry the removal end, in which at the feed end, a stream of the suspension is conducted into the process space,
  while retaining the crystals to form a crystal bed in the process space from the suspension stream conducted into the process space, a mother liquor stream is released from the process space,
  as a further component of the wash column, a removal device rotates therein at the removal end of the process space,
  the crystal bed is conveyed within the process space with at least one force other than gravity and parallel to the axis of symmetry of the process space toward the rotating removal device to meet the removal device,
  the rotating removal device removes crystals from the crystal bed which meets it,
  the stream of the crystals removed flows through the rotating removal device and/or past the rotating removal device into the crystal melt space, which adjoins the process space beyond the removal device in conveying direction of the crystal bed, of the wash column,
  as a further component of the wash column, a drive shaft which is driven about its longitudinal axis by a drive unit for rotation is conducted into the wash column from below through an inlet leading into the crystal melt space, the angle β formed between the three-dimensional direction of the axis of rotation of the drive shaft and the three-dimensional direction of the axis of symmetry of the process space not being more than 20° in any projection of the two three-dimensional directions into one plane,
  the removal device is secured on the drive shaft and the rotating drive shaft transmits the torque required for the rotation of the removal device thereto,
  the crystal stream conducted into the crystal melt space is melted in the crystal melt space and/or in a melt circuit conducted through the crystal melt space by introducing heat to give a crystal melt stream,
  the inlet for the drive shaft into the crystal melt space is equipped with a seal which counteracts the unintended exit of crystal melt from the crystal melt space through the inlet into it,
  based on the strength of the aforementioned crystal melt stream, proceeding from the crystal melt space, a substream of crystal melt, as a wash melt stream, is conducted through the rotating removal device and/or past the rotating removal device against the direction of movement of the crystal bed into the process space so as to form, in the crystal bed, a wash front which divides the crystal bed into a mother liquor zone and into a wash melt zone, and the remaining substream is sent to its outlet as a pure melt stream of the chemical target compound,
  the force which acts on the drive shaft in the longitudinal direction thereof in normal operation of the process is always directed downward,
  the drive shaft is mounted so as to be rotatable about its longitudinal axis in more than one bearing,
  the mounting in one of the bearings is configured such that the mounting in this bearing absorbs the downward force acting on the drive shaft in the longitudinal direction thereof, and
  the mounting in at least two bearings is configured such that the mounting in each of these two bearings absorbs the forces acting radially outward from the drive shaft in the particular bearing of the two bearings,
wherein the mounting in one of the bearings is additionally configured such that the mounting in this bearing is capable of absorbing an upward force acting on the drive shaft in the longitudinal direction thereof.

It is possible that the singular operating states are attributable to the fact that, in the course of recrystallization of the wash melt ascending within the crystal bed conveyed downward in the wash column, crystalline bridges form to an abruptly increased degree between the individual crystals in the wash front region (for example when $\Delta T^S$ unintentionally and unnoticed becomes too great), which counteracts the displaceability of the individual crystals with respect to one another and the aforementioned reaction force of the crystal bed on the removal elements of the removal device can increase abruptly. It is also possible for disruptions in the wash melt stream out of the crystal melt space into the process space (for example after a process interruption) to lead to passages present in the removal device becoming closed (blocked or filled with crystals) to the wash melt stream and the stream of the removed crystals. This can result in an abrupt rise in the pressure in the crystal melt space on the removal device, which can likewise contribute to an undesired axial movement of the removal device and of the drive shaft bearing it toward the crystal bed (it is also possible for the cross section of the corresponding line in the melt circuit conducted through the crystal melt space to be reduced by blocking crystals and, as a consequence, for the pressure in the melt circuit to be increased thereby). When such movements of the drive shaft and of the corotating components of the wash column secured within it are not counteracted in accordance with the invention, the result may not just be damage to the seal used but also more severe damage to the wash column (for example, the removal device moving upward may damage the filter tubes of a hydraulic wash column).

In this document, the term "bearing" includes both slide bearings and roller bearings. These are commercially available systems which comprise two parts which move relative to one another, the bearing partners. These are essentially concentric rings placed (assembled) one inside the other (an inner ring and an outer ring), the ring opening of the inner ring forming the passage orifice for the shaft to be mounted, or two washers arranged one on top of the other (an upper washer and a lower washer), each of which has a passage orifice for the shaft to be mounted. Bearings of the former structure shall be referred to here as "concentric bearings", and bearings of the latter structure shall be referred to as "sandwich bearings" or as bearings with sandwich structure. Roller bearings are bearings in which the bearing partners are separated (spaced apart) by rolling bodies (roller bodies), on which the raceways of the partners of the bearing can run. The roller bodies used may be spheres, cylinders, needles, barrels or cones. In modern roller bearings, the roller bodies are kept at the same distance by a cage surrounding each of them. In the case of slide bearings, the two bearing partners are separated from one another only by a lubricant film. In the limiting case, the outer periphery of the shaft to be mounted may assume the function of a bearing partner (coincide with the latter).

The mounting of a drive shaft in a bearing with the proviso that the drive shaft retains its ability to rotate is then configured in a manner known per se such that the drive shaft is first conducted along its longitudinal axis through the passage orifice of the bearing up to the point where the mounting should act (i.e., when a drive shaft is mounted so as to be rotatable about its longitudinal axis in more than one bearing, these bearings are mounted one behind another on the longitudinal axis of the drive shaft). The dimensions are matched to one another such that (at least as a result of static friction) one of the two bearing partners rests on the drive shaft ("the bearing partner") and corotates with it ("corotating bearing partner"), while the other bearing partner rests on or in a housing (generic name for any fixed base) surrounding the drive shaft ("the housing partner") and is stationary with respect to the rotation of the drive shaft about its own longitudinal axis ("stationary bearing partner"). For example, the housing may be secured on the wash column body as a continuation thereof in the downward direction and may consist of a plurality of elements screwed to one another.

Furthermore, the individual configuration of the internal structure of the bearing (the design of the bearing; for example the geometry of the roller bodies, the configuration of the bearing partners, the relative arrangement of the bearing partners) and of a fixing, specific for the particular mounting, of the bearing partners in the housing or on the drive shaft fixes and limits the possible positioning of the bearing partners both with respect to one another and with respect to the housing and to the drive shaft as required, such that downward and/or upward forces acting on the drive shaft in the longitudinal direction thereof and/or forces acting radially outward from the drive shaft in the bearing can be absorbed by the mounting as required and passed into the surrounding construction, and the forces do not bring about any unwanted movement of the drive shaft (possible sources for forces acting radially outward from the drive shaft (in the bearing) include, for example, an imbalance of the drive shaft and the rotating removal device).

A mounting on the drive shaft in a bearing which is configured such that it is capable of absorbing only a downward force acting on the drive shaft in the longitudinal direction thereof or only an upward force acting on the drive shaft in the longitudinal direction thereof is referred to as a unidirectional (or unidirectionally thrustable) axial thrust mounting. A mounting of the drive shaft in a bearing which is configured such that it is capable of absorbing only a downward force acting from the drive shaft in the longitudinal direction thereof as well as an upward force acting on the drive shaft in the longitudinal direction thereof is referred to as a bidirectional (or bidirectionally thrustable) axial thrust mounting.

Sandwich bearings or bearings with sandwich structure are generally referred to as axial thrust bearings because they are suitable either only for configuration of a uni- or bidirectional axial thrust mounting, or for configuring a mounting which is capable of absorbing primarily forces acting thereon in the longitudinal direction of the drive shaft.

To configure a unidirectional axial thrust mounting in a sandwich bearing (an axial thrust bearing), the position of the bearing partner which does not corotate with the drive shaft ("the housing washer") is then fixed with the aid of suitable barrier elements (fixing means) in the housing longitudinally with respect to the axis of rotation of the drive shaft in that direction (further shifting of the housing washer within the housing in this direction) in which the force which acts on the drive shaft in the longitudinal direction thereof and is to be absorbed by the mounting is directed. At the same time, the position of the corotating bearing partner ("the shaft washer") on the drive shaft is fixed with the aid of suitable barrier elements (fixing means) in the opposite direction (blocks further shifting of the shaft washer on the drive shaft in this direction). There is no need for corresponding positional fixing in the particular opposite direction.

Figure 7:
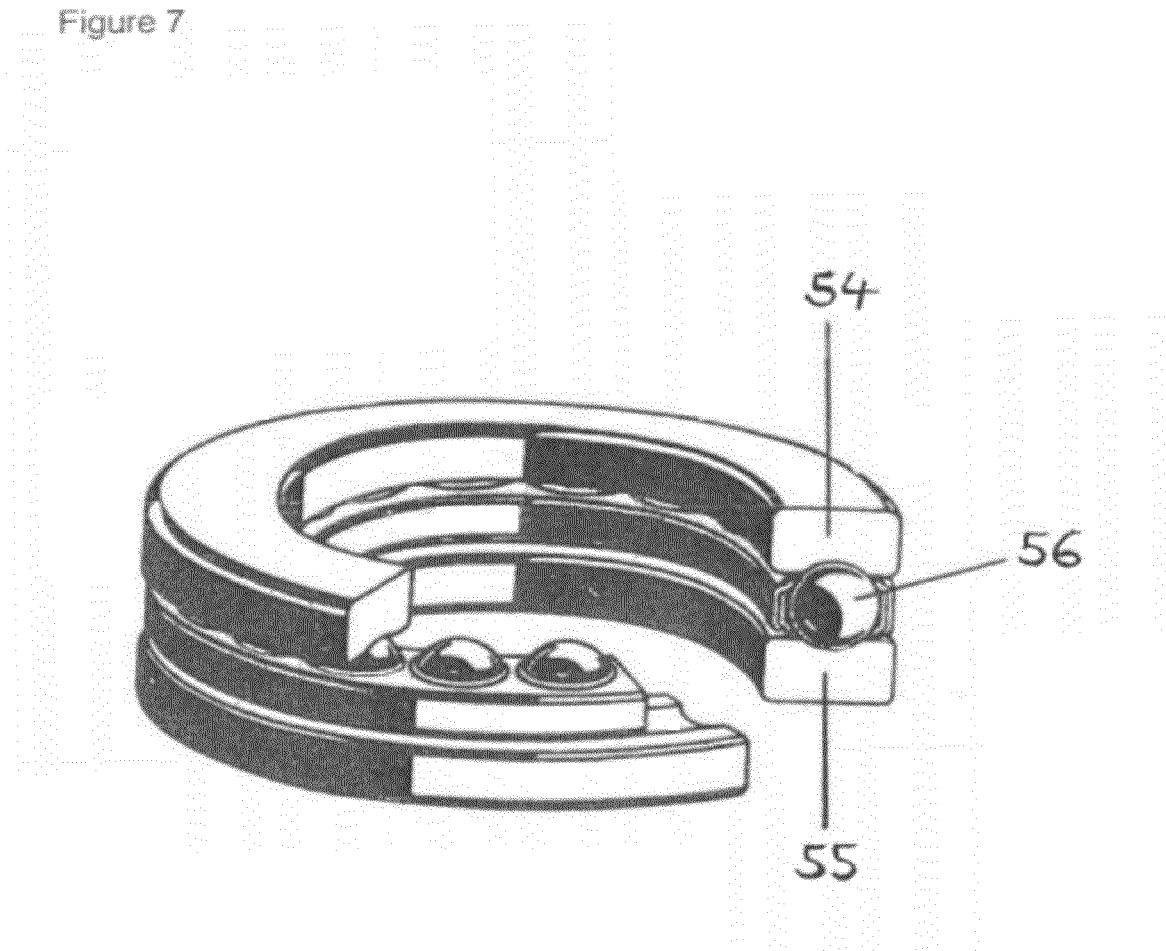
FIG. 7 shows a deep groove axial thrust bearing.

For the configuration of a unidirectional axial thrust mounting, it is possible to use, for example, deep groove axial thrust bearings (they comprise a shaft washer, a housing washer with a flat or spherical contact face and a set of balls as roller bodies, cf. FIG. 7) or cylindrical roller axial thrust bearings (they comprise a shaft washer, a housing washer and a ring of cylindrical rollers as roller bodies). In self-aligning roller axial thrust bearings (cf. FIG. 3), as is well known, the thrust is transferred from the upper raceway to the lower raceway (and vice versa) at an angle to the bearing axis. They are therefore suitable for configuration of mountings which, in addition to an axial thrust mounting, also ensure radial mounting in one of the two longitudinal directions (with an absorption capacity for radial thrusts of up to 55% of the absorption capacity of the axial thrust). Such a mixed-thrustable mounting in a bearing of any kind is referred to quite generally as a support mounting. Self-aligning roller axial thrust bearings are suitable for absorbing the highest unidirectional axial thrusts. The use of a self-aligning roller axial thrust bearing is therefore preferred in the process according to the invention for that mounting in one of the bearings in which the mounting in the bearing is configured such that it absorbs the downward force acting on the drive shaft in the longitudinal direction thereof (in the process according to the invention, it may assume particularly high values in the different operating states). A further important feature of the self-aligning roller axial thrust bearings is their angular mobility and their insensitivity to misalignment of the shaft with respect to the housing or bending of the shaft. Self-aligning roller axial thrust bearings have a large number of unsymmetrical rollers as roller bodies and narrow osculation between the raceways and the rollers.

To configure a bidirectional axial thrust mounting, appropriately in application terms, bearings with sandwich structure are used, which comprise two housing washers and one shaft washer, the shaft washer being placed between the two housing washers from the bottom upward. Fixing of the lower housing washer in the housing fixes its position in the downward direction, and fixing of the upper housing washer in the housing fixes its position in the upward direction. There is no need for corresponding positional fixing in the particular opposite direction. The position of the shaft washer on the drive shaft is fixed both in the upward and downward direction by corresponding fixing.

For configuration of a bidirectional axial thrust mounting, especially bidirectional deep groove axial thrust bearings are suitable. They comprise a shaft washer and two housing washers with a flat or spherical contact face and two sets of balls as running bodies.

In the case of mounting of a shaft in a concentric bearing, the shaft is always conducted into the bearing such that the inner ring rests on the drive shaft (shaft ring) and corotates with it, while the other bearing partner (the outer ring) rests on or in the housing (housing ring) and is stationary relative to the rotation of the drive shaft. For this reason, a mounting of the drive shaft in a concentric bearing is always capable to a certain degree of absorbing forces acting radially outward from the drive shaft in the bearing. When the mounting of the drive shaft in a concentric bearing is further configured such that it is not capable of absorbing any forces acting on the drive shaft in the longitudinal direction thereof, this results in a mounting which is referred to as a radial mounting. In this case, the drive shaft, in spite of rotatable mounting in a bearing, would be displaceable in both longitudinal directions by forces acting on the drive shaft in the longitudinal direction thereof. Radial mounting results, for example, when, in the case of mounting of the drive shaft in a concentric roller bearing, the position of the shaft ring (of the inner ring) is fixed with the aid of suitable barrier elements (fixing means) on the drive shaft in both longitudinal directions (the displacement of the shaft ring is blocked in both longitudinal directions), but the housing ring (the outer ring) in the housing is displaceable in both longitudinal directions along the axis of rotation of the drive shaft. In this case, the drive shaft would, in the case of a force acting thereon in the longitudinal direction thereof, move together with the bearing in the direction of the active force. When the converse procedure is followed (the position of the housing ring is fixed in both longitudinal directions and the shaft ring is displaceable in both longitudinal directions on the drive shaft), a force acting on the drive shaft in the longitudinal direction thereof would displace the drive shaft in the direction of force through the bore of the concentric roller bearing. The two cases of radial mounting detailed by way of example are also referred to as loose mounting.

In addition, the individual configuration of the inner structure of a concentric bearing (the design of the bearing; for example the geometry of the roller bodies, the configuration of the bearing partners, the relative arrangement of the bearing partners) and a fixing, specific to the particular mounting, of the position of the bearing partners in longitudinal direction of the drive shaft in the housing and on the drive shaft allows the mounting in a concentric bearing to be configured in a manner known per se such that the mounting, in addition to the forces acting radially outward from the drive shaft in the bearing, is also capable of absorbing forces acting on the drive shaft in one of the two longitudinal directions (i.e. downward or upward) or in both longitudinal directions thereof. The mounting which results in the first case is referred to as support mounting; the latter case is referred to as guide mounting. Mounting of the drive shaft in a bearing which is configured such that it is capable of absorbing forces acting in both longitudinal directions of the drive shaft is generally also referred to as bidirectional fixed mounting (when the mounting is configured such that it is capable of absorbing forces acting only in one longitudinal direction of the drive shaft, it is generally also referred to as unidirectional fixed mounting).

In the case of guide mounting of the drive shaft in a concentric roller bearing, both the position of the shaft ring (of the inner ring) on the drive shaft in both longitudinal directions and the position of the housing ring in the housing along the axis of rotation of the drive shaft in both directions are fixed with the aid of suitable barrier elements (fixing means). In the case of support bearing of the drive shaft in a concentric roller bearing, the position of the housing ring in the housing along the axis of rotation of the drive shaft is fixed in that direction possessed by the force acting on the drive shaft in the longitudinal direction thereof. At the same time, the position of the shaft ring on the drive shaft is fixed in the opposite direction (blocks further displacement of the shaft washer on the drive shaft in this direction). There is no need for corresponding positional fixing in the particular opposite direction.

Examples of concentric roller bearings usable for the process according to the invention include the deep groove ball bearing (DIN 625; it is suitable for configuration of a mounting for absorbing a primarily radial thrust), the one-row angular contact ball bearing (DIN 628; it is suitable for configuration of a mounting which is capable of absorbing both a high unidirectional axial thrust and a high radial thrust (a support mounting)), the two-row angular contact ball bearing (it corresponds to two one-row angular contact ball bearings in O arrangement and is suitable for configuration of mountings for absorbing radial and bidirectional axial thrust (guide mounting)), the self-aligning ball bearing (DIN 630; it possesses two ball rows and is suitable for configuration of mountings for absorption of radial and bidirectional axial thrust (guide mounting)), the cylindrical roller bearing (DIN 5412; it is suitable for configuration of mountings for absorbing a primarily radial thrust), the ball roller bearing (DIN 720; it is suitable for configuration of mountings for absorbing radial and unidirectionally axial thrust (support mounting)) and the self-aligning roller bearing (DIN 635; self-aligning roller bearings (cf. FIG. 8) have two roller series with a common hollow spherical raceway in the outer ring; the inner ring has two raceways inclined with respect to the bearing axis; they are angularly mobile and as a result insensitive to misalignments of the shaft with respect to the housing or bending of the shaft; apart from radial thrusts, when fixed (configured) appropriately, they can additionally absorb axial thrusts in only one longitudinal direction (support mounting) or in both longitudinal directions (guide mounting)).

Since mountings in concentric bearings can generally be configured such that they are capable of absorbing both radial and axial thrusts, names for concentric bearings have neither the prefix "radial thrust" nor the prefix "axial thrust".

The bearing partners can be fixed in their position in one or in both longitudinal directions in the housing or on the drive shaft by nonpositively or positively locking connection and/or cohesive connection. Useful means for securing (fixing) in the housing include, for example, caps, support washers, threaded rings, housing shoulders, spacer sleeves and securing rings. Examples of means for securing (fixing) on the shaft are securing rings or grooved rings (e.g. Seeger rings), shaft nuts, spacer sleeves, spacer rings, oversize fits, tension sleeves, stop collars (shoulders), tension screws, nuts and washers with a central screw at the shaft end. For example, the inner ring can be clamped on the shaft between a stop collar and a tension screw or a nut, or pressed on with a tension sleeve. In the housing, the outer ring is often pressed by the cap against a stop collar, or held with a Seeger ring. In the process of shrinkage, the bearing is brought to high temperatures. This expands the entire bearing which is pushed over the cold shaft in the heated state. As it cools, it contracts and adjoins the shaft extremely tightly. In principle, it is also possible to use adhesive bonds. Of course, the fixing can also be undertaken by press fitting.

Detailed information on the configuration of mountings of shafts in slide bearings and roller bearings can be found, for example, in Dubbel, Taschenbuch für den Maschinenbau [Mechanical engineering handbook], 21st edition, K-H. Grote and J. Feldhusen, Springer Verlag (2005), and also in the SKF main catalogue from SKF GmbH Mannheim (1986) and at www.skf.com.

As already mentioned, bearings for use in accordance with the invention for the mounting of the drive shaft are commercially available and should be selected such that they are capable of withstanding the magnitude of their expected thrust, even in long-term operation (generally at least 1000 or at least 2000 operating hours). High-quality bearings possess lifetimes of up to 100 000 operating hours and more.

The inventive procedure is relevant especially for those purifying wash column separation processes in which that mounting in the at least two bearings which absorbs the downward force acting on the drive shaft in the longitudinal direction thereof (including the bearing used for this mounting) is designed (configured) such that it is capable of absorbing downward forces acting on the drive shaft in the longitudinal direction thereof which are $\geq 50$ kN, or $\geq 75$ kN, or $\geq 100$ kN or $\geq 1000$ kN. In general, the configuration (the design) is effected, for safety reasons, such that the installed thrust rating is above the probable (expected) maximum thrust for the different possible operating states. In general, the above design thrust rating in the process according to the invention will, however, not exceed 20 000 kN, frequently 10 000 kN (an overload fracture generally occurs in the bearing and not at the fixing of the bearing partners).

The process according to the invention is thus of significance not least when the maximum diameter of the drive shaft in the length region (longitudinal section) thereof which is between the removal device and that bearing in which the mounting of the drive shaft is configured such that it absorbs the downward force acting on the drive shaft in the longitudinal direction thereof is in the range from 50 mm to 400 mm, or in the range from 100 to 300 mm, or in the range from 150 mm to 250 mm. This is true in particular when both the drive shaft and the removal device are manufactured from steel (e.g. stainless steel). The aforementioned diameter is normally fixed by correlation with the expected thrust (the greater the expected thrust, the greater the diameter).

One embodiment of the process according to the invention may consist, for example, in that that mounting whose bearing is configured such that it absorbs the downward force acting on the drive shaft in the longitudinal direction thereof is configured as a guide mounting. In other words, it is configured as a mounting which is configured such that it absorbs both the downward force acting on the drive shaft in the longitudinal direction thereof and an upward force acting on the drive shaft in the longitudinal direction thereof, and additionally also the forces acting radially outward from the drive shaft in the bearing. Such a guide mounting can be configured, for example, in a bidirectional angular contact ball bearing, in a self-aligning ball bearing, or in a self-aligning roller bearing. The process according to the invention then further requires only the mounting of the drive shaft in a further bearing, in which case this mounting should be configured as a purely radial mounting, i.e. in such a way that it absorbs only the forces acting radially outward from the drive shaft in this bearing. Appropriately in accordance with the invention, a useful bearing for such a solely radial mounting is a deep groove ball bearing or a self-aligning roller bearing. Viewed from the top downward, advantageously in accordance with the invention, first the radial mounting and below that the guide mounting would be configured below the removal device. Of course, the one pure radial mounting in the above-described embodiment of the invention can, if required, be supplemented by additional further solely radial mountings.

However, it is preferred in accordance with the invention to absorb a plurality of different thrusts to be considered not in an individual bearing, as is the case for a guide mounting, but to divide the absorption of these thrusts between several bearings. This is the case especially when individual expected thrusts are very great (for example, in the process according to the invention, the downward force acting on the drive shaft in the longitudinal direction thereof). In this case, the particular mounting can be tailored to the expected particular thrust to be absorbed.

An alternative improved embodiment of the process according to the invention therefore consists, for example, in configuring that mounting whose bearing is configured so as to absorb the downward force acting on the drive shaft in the longitudinal direction thereof only as a support mounting.

In other words, it is configured as a mounting which is configured such that it absorbs only the downward force acting in the drive shaft in the longitudinal direction thereof, and additionally the forces acting radially outward from the drive shaft in the bearing. Such a support mounting can be configured, for example, advantageously in accordance with the invention, in a self-aligning roller axial thrust bearing. Furthermore, the performance of the inventive procedure then also requires at least the mounting of the drive shaft in a further bearing, in which case this mounting may likewise be configured as a support mounting, specifically in such a way that it firstly absorbs an upward force acting on the drive shaft in the longitudinal direction thereof and additionally the forces acting radially outward from the drive shaft in this bearing. Advantageously in accordance with the invention, this mounting will be configured in a self-aligning roller bearing. Of course, the two above mountings can, if required, be supplemented by additional solely radial mountings (these may likewise be configured, for example, in a self-aligning roller bearing). Viewed from the top downward, preferably in accordance with the invention, first the radial mounting, then the first support mounting for an upward force acting on the drive shaft in the longitudinal direction thereof and finally the second support mounting for the downward force acting on the drive shaft in the longitudinal direction thereof would be configured below the removal device. Advantageously, the clear separation of the two support mountings is not more than 150 cm, better not more than 100 cm and preferably not more than 50 cm. In general, the above clear distance will, however, be at least 10 cm. The above embodiment is advantageous especially when the seal used is a double-action axial slip ring seal, since the additional radial bearing, which is preferably configured as close as possible to the removal device, particularly efficiently counteracts a possible misalignment of the particular two slip rings. Of course, the present invention, however, also comprises those embodiments in which, instead of one and/or the other support mounting, a combination of a unidirectional axial thrust mounting and a radial mounting (which are each configured in two independent bearings) is employed in each case.

Overall, the inventive mounting of the drive shaft in the manner as required enables very substantially friction-free rotation of the drive shaft about its longitudinal axis, with the simultaneously defined position in the space and hence also disruption-free process execution in long-term operation of the process according to the invention. This is especially true when that mounting which is configured in one of the bearings such that it absorbs an upward force acting on the drive shaft in the longitudinal direction thereof, including the corresponding bearing, is capable of absorbing an upward force acting in axial direction of the drive shaft which is $\geq 50$ kN, or $\geq 75$ kN, or $\geq 100$ kN, or $\geq 1000$ kN (generally $\leq 20 000$ kN, or $\leq 10 000$ kN).

In axial direction, the bearings used in the process according to the invention are preferably mounted below the seal, which prevents them from coming into contact with the crystal melt or with the crystal suspension in the course of process operation. Bearings for use in accordance with the invention are preferably manufactured from bearing stainless steel.

For reasons of alteration of the material expansion with temperature (especially when, in the course of the process according to the invention, the downward force acting on the drive shaft in the longitudinal direction thereof is absorbed in a different bearing than an upward force acting on the drive shaft in the longitudinal direction thereof) among other reasons, the inventive mounting in that bearing which absorbs an upward force acting on the drive shaft in the longitudinal direction thereof is, appropriately in application terms, frequently configured such that the force is not absorbed immediately when the force acts, but only after a limited movement, caused by the force, of the drive shaft and of the components secured thereon in the corresponding longitudinal direction. Such a longitudinal play of the mounting may, for example, be $\leq 10$ cm, better $\leq 5$ cm, advantageously $\leq 1.5$ cm and particularly advantageously $\leq 1.0$ cm or $\leq 0.5$ mm. Especially in the case of use of a double-action axial slip ring seal, the longitudinal play described is kept as small as possible.

Otherwise, all statements made in this document with regard to the performance of a wash column removal process with forced transport of the crystal bed are also valid for the inventive procedure.

In other words, in the process according to the invention too, $\alpha$ is preferably $\leq 10°$, better $\leq 5°$ and more preferably $0°$. Moreover, $\beta$ in the process according to the invention is also preferably $\leq 10°$, better $\leq 5°$ and more preferably $0°$.

The content of the chemical target compound in the crystal suspension conducted into the process space of the wash column in the process according to the invention will frequently be $\geq 60\%$ by weight, or $\geq 70\%$ by weight, or $\geq 80\%$ by weight, or $\geq 90\%$ by weight, or $\geq 95\%$ by weight (it is naturally $<100\%$ by weight, usually $\leq 98\%$ by weight). The process according to the invention is particularly relevant when the degree of crystallization of the crystal suspension conducted into the process space of the wash column in the process according to the invention is $\geq 0.10$, or $\geq 0.20$, or $\geq 0.25$. In general, the aforementioned degree of crystallization in the process according to the invention will be $\leq 0.60$, frequently $\leq 0.50$ and in some cases $\leq 0.40$. Degrees of crystallization relevant in accordance with the invention are thus, for example, also those in the range of 0.2 to 0.3.

All statements made so far in this document are especially valid when the chemical target compound is a compound from the group consisting of acrylic acid, methacrylic acid, N-vinylpyrrolidone and p-xylene.

This is true in particular when the crystal suspension fed to the process space of the wash column in the process according to the invention comprises $\geq 65\%$ by weight of acrylic acid and 0.1 to 30% by weight of water. However, it is also true when the aforementioned crystal suspension comprises $\geq 80\%$ by weight of acrylic acid and 0.5 to 15% by weight of water, or $\geq 90\%$ by weight of acrylic acid and 0.7 to 9% by weight of water (the chemical target compound in each case is acrylic acid). This is true not least because water has a comparatively low molecular weight. A fluctuating water content therefore has a perceptible effect on $T^{SP}$ and, resulting from this, on $\Delta T^S$ (cf., for example, DE-A 102007043758).

In other words, the process according to the invention is employable, for example, when acrylic acid is the chemical target compound, and the crystal suspension fed to the process space has the following contents:

| | |
|---|---|
| $\geq 70\%$ by wt. of | acrylic acid, |
| up to 20% by wt. of | water, |
| up to 15% by wt. of | acetic acid, |
| up to 5% by wt. of | propionic acid, |
| up to 5% by wt. of | aldehydes, |
| up to 3% by wt. of | polymerization inhibitors and |
| up to 5% by wt. of | acrylic acid oligomers (Michael adducts). |

However, it is also employable when acrylic acid is the target compound and the crystal suspension fed to the process space has the following contents:

| | |
|---|---|
| 90 to 98% by wt. of | acrylic acid, |
| 0.2 to 5% by wt. of | water, |
| 0.001 to 3% by wt. of | acrolein, |
| 0.001 to 3% by wt. of | methacrolein, |
| 0.001 to 3% by wt. of | propionic acid, |
| 0.001 to 3% by wt. of | aldehydes other than acrolein and methacrolein, and |
| 0.001 to 3% by wt. of | maleic acid. |

All statements made in this document apply especially when the longest dimension of the crystals (the longest direct line connecting two points on the crystal surface), for the majority (more than the numerical half of all crystals), is 50 to 1500 µm or 200 to 800 µm.

All remarks in this document apply not least when $\Delta T^S$ in normal operation of the process according to the invention is 5 to 15° C. However, $\Delta T^S$ may also be 1 to 20° C. or 5 to 10° C.

Appropriately in application terms, the removal device in the process according to the invention is configured as a bladed disk. The latter is preferably circular. As passages which connect the process space to the crystal melt space for the crystals removed from the crystal bed, it has slots (passage orifices) at whose edge (the side of the outline of the slot (for example of the elongated hole) facing away from the rotation direction) the blades are arranged. The slots with the blades are preferably distributed over the bladed disk such that crystals are removed over the entire end of the crystal bed facing the bladed disk when the bladed disk rotates. The slots are advantageously aligned radially, and each slot is equipped with an oblique blade with which the crystals are removed from the crystal bed. The distribution of the slots over the bladed disk is preferably also configured such that essentially the same mass flow of crystals flows through each slot in one rotation of the bladed disk. The particular blade projects over the surface facing the crystal bed (this does not take into account any profile thereof, i.e. the reference point is the highest point of the profile) (typically 1 to 15 mm, often 2 to 10 mm, or 3 to 5 mm), such that crystals are removed by the blade and fed to the slot orifice.

The radius of bladed disks suitable in accordance with the invention, for industrial scale processes, may, for example, be 300 to 3000 mm. The aforementioned slots frequently have elongated hole geometry (the definition of an elongated hole can be found, for example, in DE-A 102007028333 and in DE-A 102007028332). However, the slot geometry may also be rectangular, or between that of an elongated hole and that of a rectangle.

Figure 5:
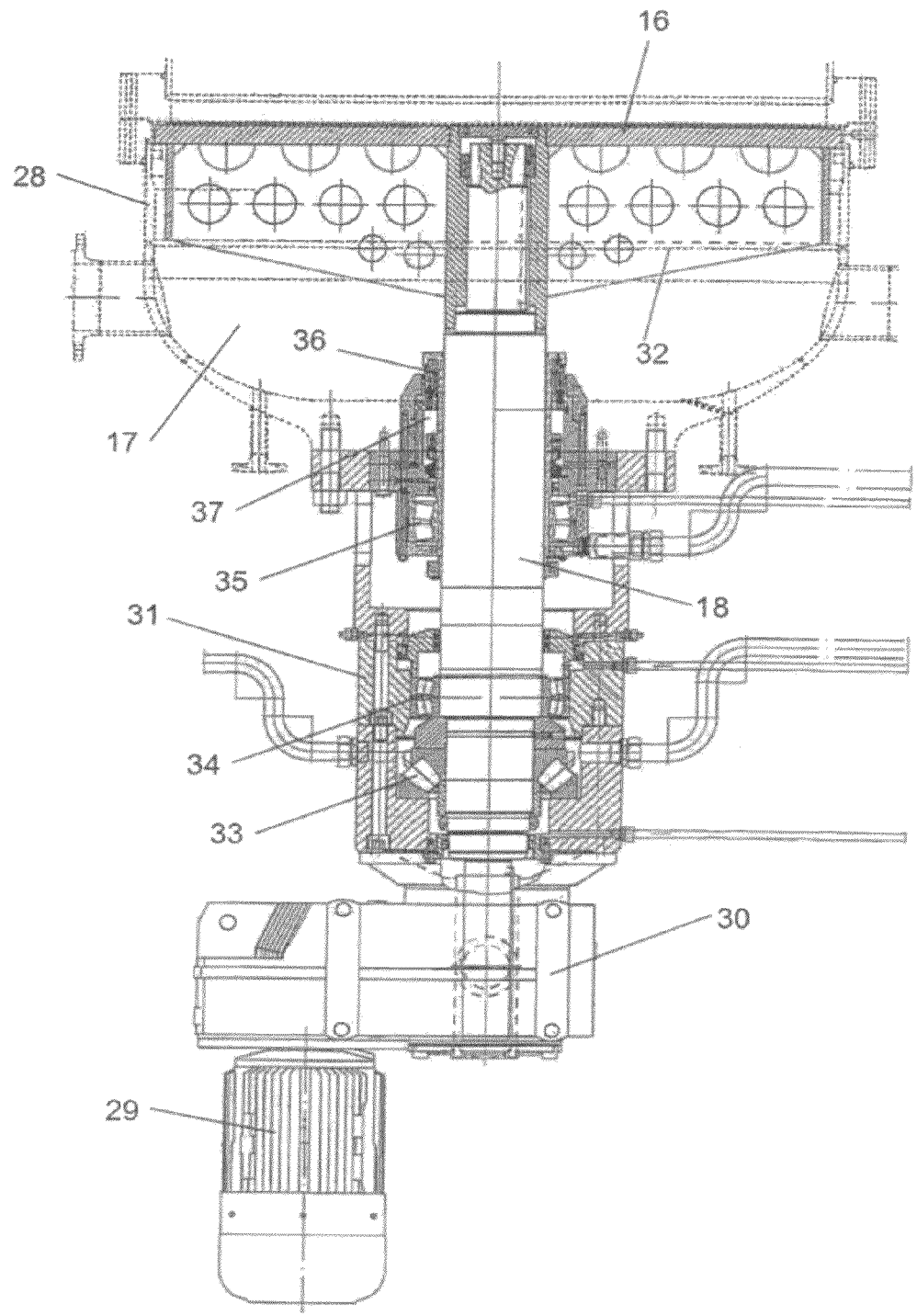
FIG. 5 shows a section of a wash apparatus suitable for performing a process according to the invention.
Figure 8:
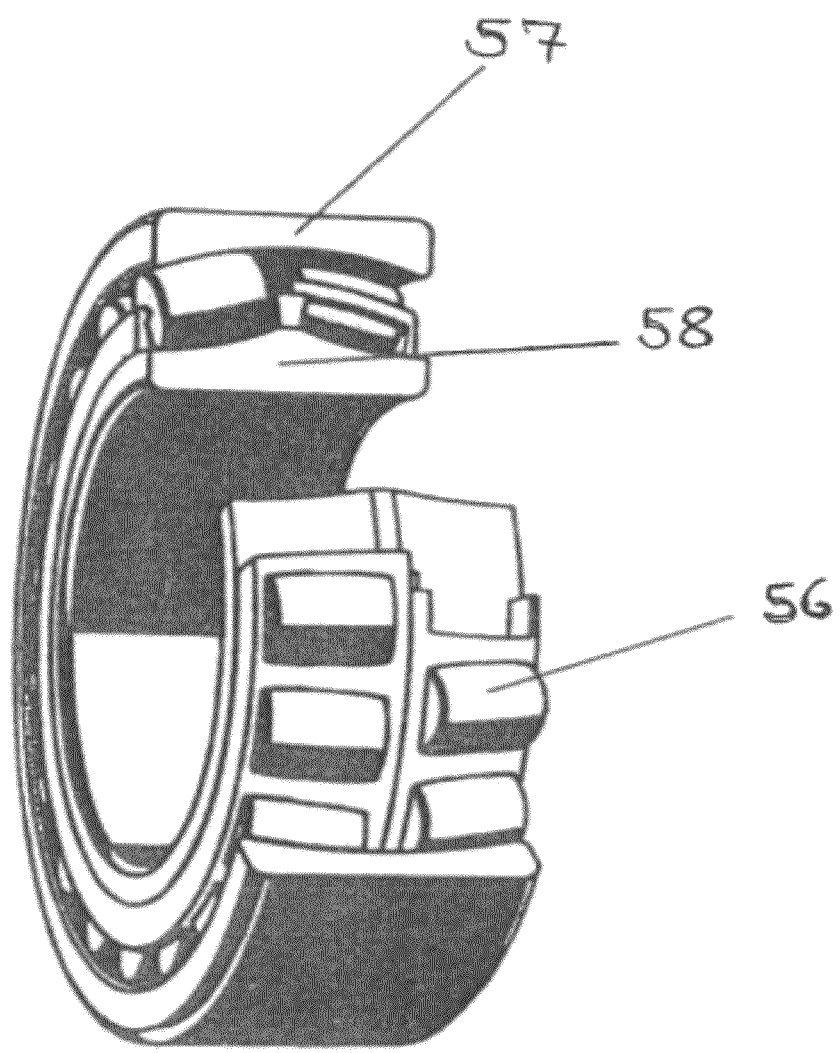
FIG. 8 shows a self-aligning roller bearing.

The hole diameter (separation of the two long edges) may, for example, be 20 to 100 mm (typically 50 to 70 mm), and the separation of the two hole centers 100 mm to 500 mm. The surface of the bladed disk facing toward the crystal bed is, appropriately in application terms, also provided with a profile of concentric grooves (the groove cross section is advantageously triangular; the groove depth may, for example, be 2 to 10 mm, or 3 to 7 mm, the groove width may be 10 to 15 mm, and the separation of successive grooves in radial direction may be such that the corresponding triangular cross sections have common vertices). The profile ensures very substantially homogeneous distribution of the wash melt flowing back from the wash melt space into the process space over the cross section of the process space. FIGS. 5 and 8 of EP-A1448282 show illustrative configurations of a bladed disk suitable in accordance with the invention as a removal device. The angle γ formed by the surface of the removal elements of the removal device (for example the removal blades) and the axis of rotation of the drive shaft is, in the process according to the invention (as already stated), frequently 20° to 70°, and in many cases 30° to 60°. In the process according to the invention, the drive shaft projects, coming from below, advantageously in application terms, up to the bladed disk (or generally up to the removal device). Lamellae (linear elements) equipped with hole orifices running radially away from the drive shaft bear (support) the bladed disk in an appropriate manner in application terms. Of course, the rotating removal device can also be configured as described in WO 2009/148314. Otherwise, the process according to the invention can be performed like the prior art referred to in this document. This includes especially EP-B 1448282, WO 01/77056, German application 102008040340.7, WO 2006/111565, WO 2009/148314 and DE-A 102007004960.

Typical crystal mass feed flows (especially in the case of acrylic acid crystals), based on the cross-sectional area of the process space at the feed end thereof, in the process according to the invention, are 1 to 20 t/m²·h (t=metric tonne). The speed of the drive shaft is typically 2 to 40, frequently 4 to 20 and often 4 to 10 per minute. The length of the drive shaft, especially for industrial scale processes, is 0.5 to 4 m.

FIG. 1 shows a diagram in longitudinal section of the principle of function of a hydraulic wash column without a distributor space. The numerical addresses have the following meanings:
1: suspension of the crystals of the chemical target compound in mother liquor;
2: mother liquor stream released from the process space;
3: outlet for the pure melt stream of the chemical target compound;
4: flowing mother liquor which generates the conveying pressure;
5: crystal bed conveyed from the top downward;
6: wash melt streaming from the bottom upward;
7: process space of the wash column;
8: conveying pump for the crystal suspension;
9: melter (e.g. heat transferer) for melting the crystals removed in the melt circuit;
10: regulating valve for adjusting the strength of the wash melt stream;
11: melt circuit pump;
12: melt circuit;
13: pump for mother liquor recycled as the control stream;
14: filter tube (on the industrial scale, a bundle of filter tubes is used (cf., for example, FIG. 3 of EP-A 1448282));
15: filter integrated in the filter tube;
16: rotating removal device (e.g. bladed disk);
17: crystal melt space;
18: drive shaft;
19: seal.

Figure 2:
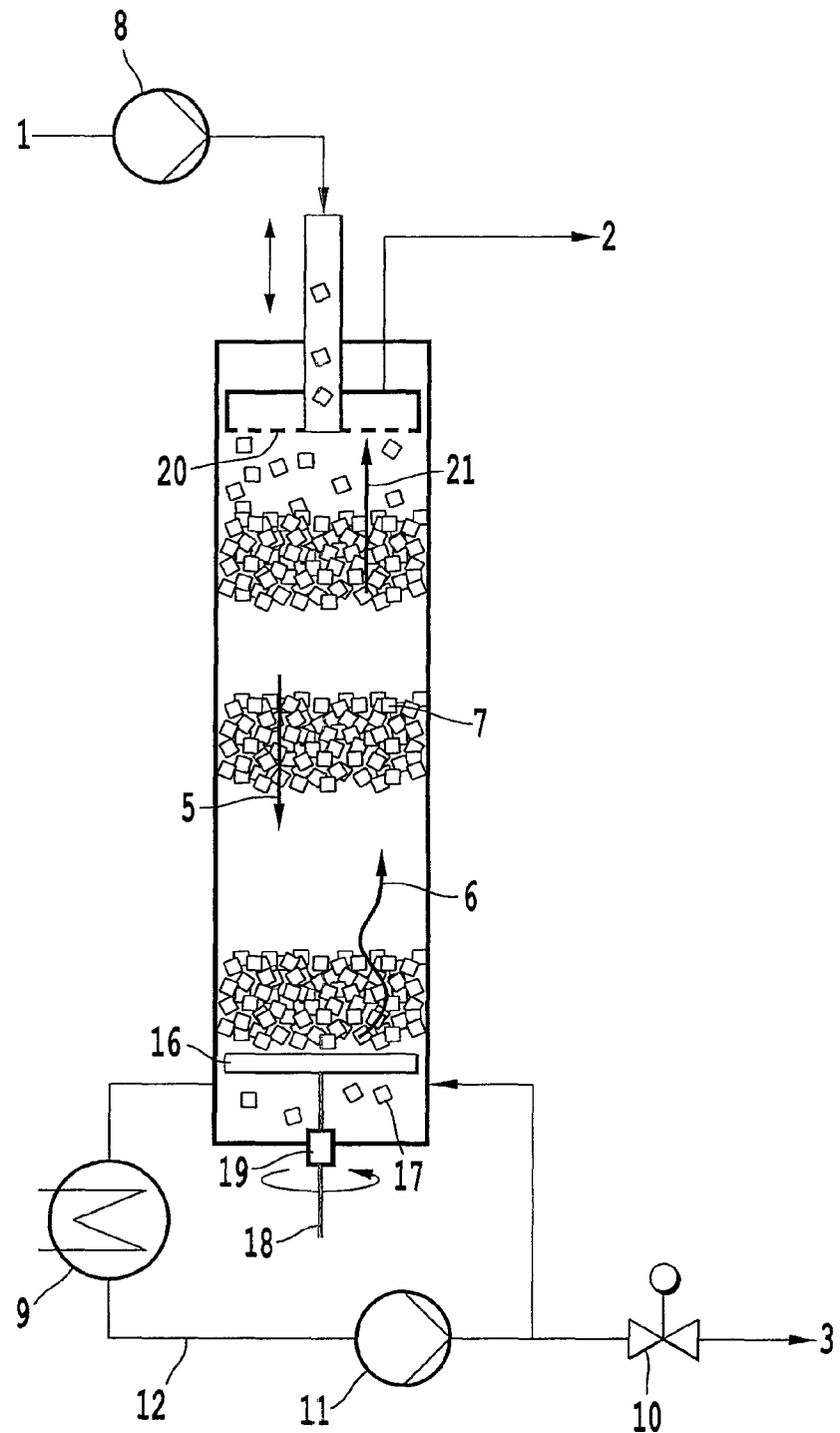
FIG. 2 shows a diagram in longitudinal section of the principle of function of a mechanical wash column without distributor space.

FIG. 2 shows a diagram in longitudinal section of the principle of function of a mechanical wash column without distributor space, which, as the mechanical forced conveying device, uses an oscillating piston with a filtering end face and mother liquor removal.

Numerically identical addresses have the same meaning as in FIG. 1. In addition, the two following numerical addresses in FIG. 2 have the following meanings:
20: oscillating piston with filtering end face;
21: mother liquor to be released from the process space.

Figure 3:
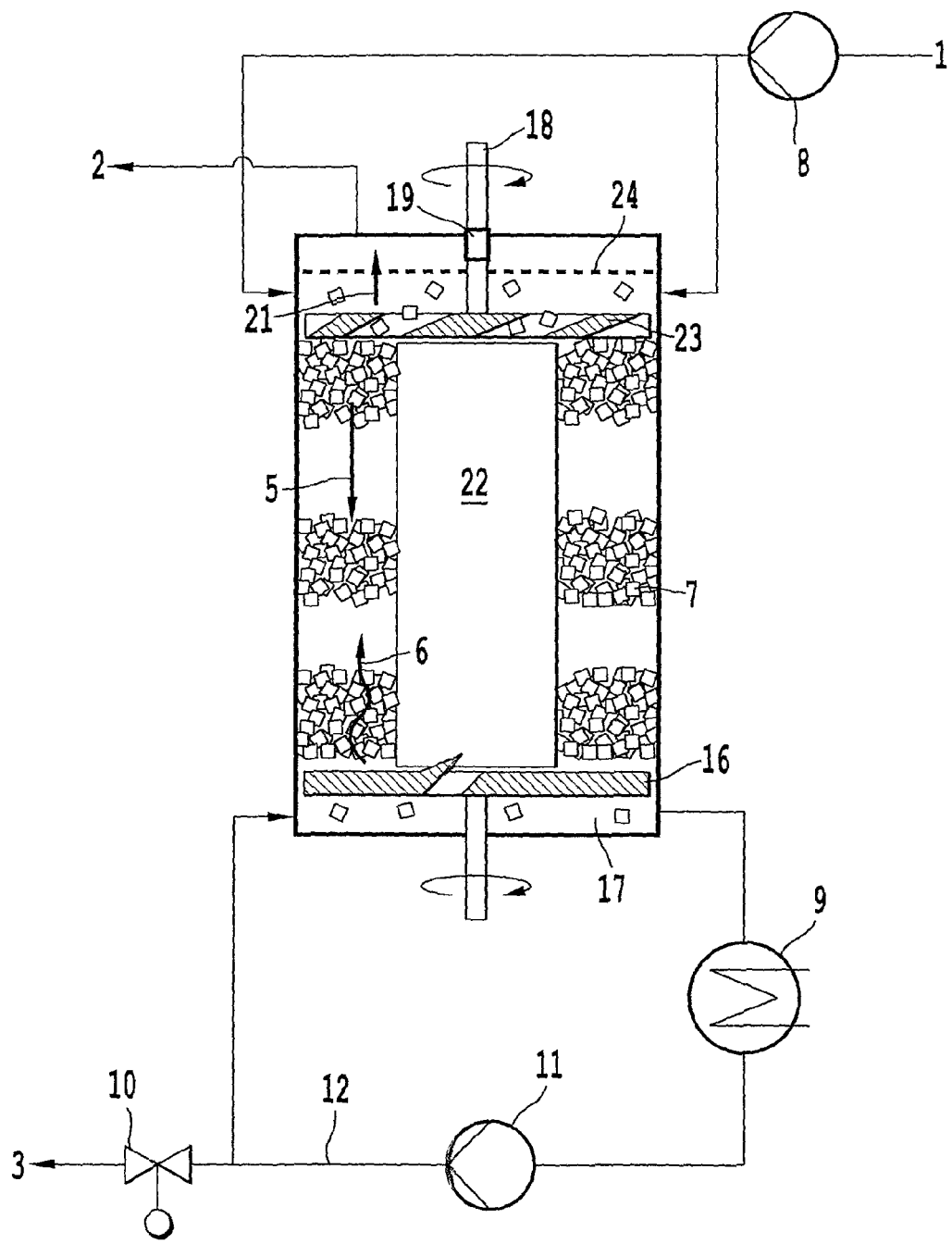
FIG. 3 shows a diagram in longitudinal section of the principle of function of a mechanical wash column without distributor space, with a rotating conveying element for mechanical forced conveying.

FIG. 3 shows a diagram in longitudinal section of the principle of function of a mechanical wash column without distributor space, with a rotating conveying element for mechanical forced conveying. In addition to the numerical addresses already used in FIGS. 1 and 2 with identical meanings, the following new numerical addresses in FIG. 3 have the following meanings:
22: central displacement body according to EP-B 1448282 for ensuring a more homogeneous crystal bed;
23: rotating conveying element;
24: filter.

Figure 4:
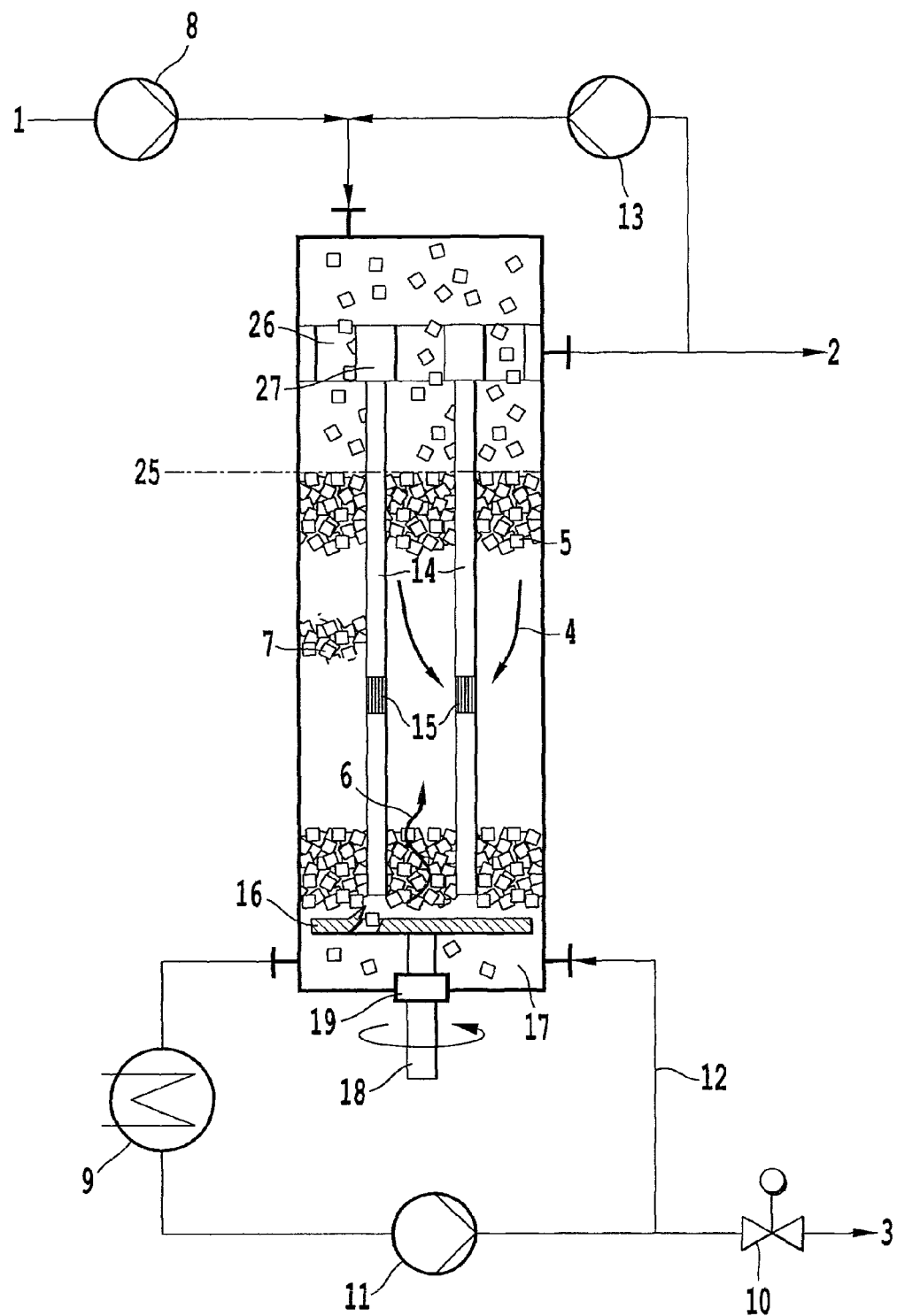
FIG. 4 shows a diagram in longitudinal section of the principle of function of a hydraulic wash column with distributor space upstream of the process space.

FIG. 4 shows a diagram in longitudinal section of the principle of function of a hydraulic wash column with distributor space upstream of the process space. In addition to the numerical addresses already used in FIGS. 1, 2 and 3 with identical meanings, the following new numerical addresses in FIG. 4 have the following meanings:
25: buildup front;
26: distributor tray for the suspension of the crystals;
27: collecting tray for the mother liquor removal.

FIG. 5 shows a section of a wash apparatus suitable for performing a process according to the invention. In addition to the numerical addresses already used in FIGS. 1 to 4 with identical meanings, the following new numerical addresses in FIG. 5 have the following meanings:
28: wall of the wash column;
29: electric motor with transmission for driving the rotational movement of the drive shaft;
30: clutch system for transferring the torque to the drive shaft; the weight of clutch system and motor does not normally act on the drive shaft, since they are generally kept separate;
31: housing surrounding the drive shaft (fixed base), which consists of a plurality of parts screwed to one another and which is screwed to the wash column body;
32: lamellae which support the removal device (a slotted bladed disk);
33: support mounting of the drive shaft in a self-aligning roller axial thrust bearing for absorbing a downward force acting on the drive shaft in the longitudinal direction thereof;
34: support mounting of the drive shaft in a self-aligning roller bearing for absorbing an upward force acting on the drive shaft in the longitudinal direction thereof;
35: radial mounting of the drive shaft in a self-aligning roller bearing;
36: upper slip ring pair, standing in the crystal melt, of the double-action axial slip ring seal;
37: barrier space, filled with barrier fluid, of the double-action axial slip ring seal.

Figure 6:
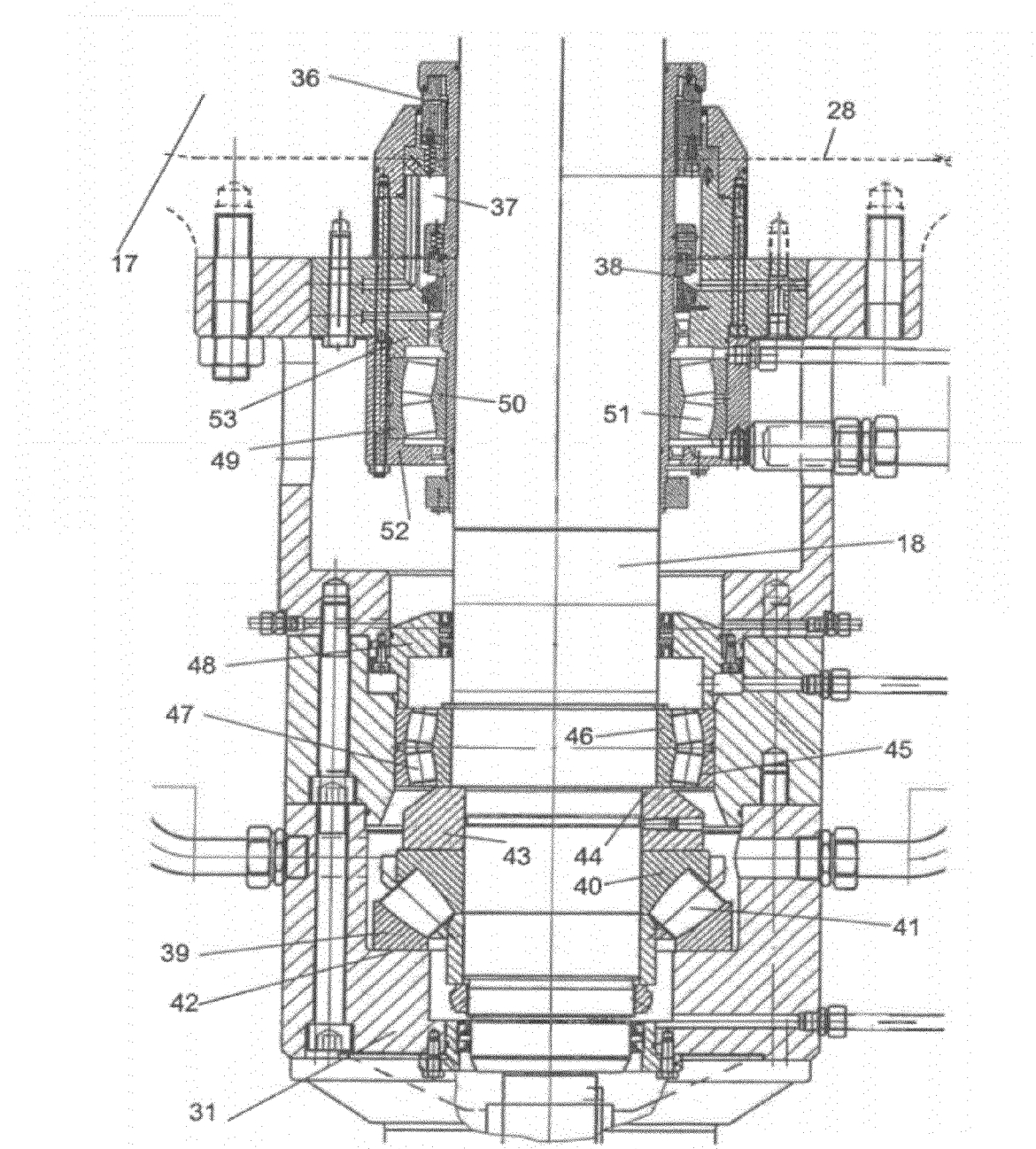
FIG. 6 shows a particularly relevant section with a view to the present invention of the wash apparatus.

FIG. 6 shows the particularly relevant section with a view to the present invention of the wash apparatus depicted in FIG. 5 in enlarged form. In addition to the numerical addresses already used in FIGS. 1 to 5 with identical meanings, the following new numerical addresses in FIG. 6 have the following meanings:
38: lower slip ring pair of the double-action axial slip ring seal;

39: housing washer of the self-aligning roller axial thrust bearing;

40: shaft washer of the self-aligning roller axial thrust bearing;

41: roller body of the self-aligning roller axial thrust bearing (the self-aligning roller axial thrust bearing for configuration of the support mounting of the drive shaft, which absorbs the downward force acting on the drive shaft in the longitudinal direction thereof, is preferably a 29438 E self-aligning roller axial thrust bearing from SKF GmbH in D-68219 Mannheim; the resulting axial thrust rating (as always in this document, as the dynamic load rating) is approx. 2850 kN);

42: housing shoulder (indentation in the lower part of the housing), which fixes the position of the housing washer of the self-aligning roller axial thrust bearing in the housing along the rotational axis of the drive shaft in the downward direction; there is no corresponding positional fixing of the housing washer in the upward direction;

43: spacer ring which, together with the stop collar 44 present above it (indentation on the drive shaft), fixes the position of the shaft washer on the drive shaft in the upward direction; there is no corresponding positional fixing of the shaft washer in the downward direction;

44: indentation on the drive shaft (stop collar);

45: outer ring of the first self-aligning roller bearing (first housing ring);

46: inner ring of the first self-aligning roller bearing (first shaft ring);

47: roller bodies of the first self-aligning roller bearing (the first self-aligning roller bearing for configuration of the support mounting of the drive shaft, which absorbs an upward force acting on the drive shaft in the longitudinal direction thereof, is preferably a 23044 CC/W33 self-aligning roller bearing from SKF GmbH in D-68219 Mannheim; the resulting axial thrust rating is approx. 290 kN (dynamic load rating); the radial dynamic load rating is approx. 1220 kN);

48: support washer which is screwed to the housing and fixes the position of the first housing ring in the housing along the axis of rotation of the drive shaft in the upward direction; there is no corresponding positional fixing of the first outer ring (first housing ring) in the downward direction; the position of the first shaft ring (first inner ring) on the drive shaft is fixed in the downward direction by the spacer ring 43; there is no corresponding positional fixing of the first shaft ring in the upward direction;

49: outer ring of the second self-aligning roller bearing (second housing ring);

50: inner ring of the second self-aligning roller bearing (second shaft ring);

51: roller bodies of the second self-aligning roller bearing (the second self-aligning roller bearing for configuring the radial mounting of the drive shaft in the immediate proximity of the double-action axial slip ring seal is preferably a 23048.C3 self-aligning roller bearing from SKF GmbH in D-68219 Mannheim; the radial dynamic load rating is approx. 1130 kN);

52: support washer which is screwed to the housing and fixes the position of the second housing ring in the housing along the axis of rotation of the drive shaft in the downward direction;

53: housing shoulder (indentation in the upper part of the housing), which fixes the position of the second housing ring in the housing along the axis of rotation of the drive shaft in the upward direction;

the position of the second shaft ring on the drive shaft is fixed neither in the upward nor in the downward direction, resulting in a typical loose mounting.

In summary, FIGS. 5 and 6 show, by way of example, a preferred inventive mounting of the drive shaft for the removal device of the wash column. Overall, the drive shaft is mounted so as to be rotatable about its longitudinal axis in three (3) bearings. The mounting in the lowermost bearing from the top downward is configured as a support mounting which absorbs both the downward force acting on the drive shaft in the longitudinal direction thereof and the forces acting radially outward from the drive shaft in the self-aligning roller axial thrust bearing. The mounting in the uppermost bearing from the top downward is configured as a radial mounting which absorbs only the forces acting radially outward from the drive shaft in the uppermost self-aligning roller bearing. The potential possibility of also employing the upper of the two self-aligning roller bearings to give a support mounting or even guide mounting of the drive shaft is deliberately not exploited. The middle bearing from the top downward is again configured as a support mounting which absorbs both an upward force acting on the drive shaft in the longitudinal direction thereof and the forces acting radially outward from the drive shaft in the middle self-aligning roller bearing.

This configuration of the inventive mounting is suitable especially when the weight GM of the total mass of the drive shaft and all corotating components of the wash column secured to it is at least 3 kN or at least 5 kN, or at least 8 kN, or at least 10 kN, or at least 13 kN (the weight GM will normally be $\leq$50 kN or $\leq$40 kN, or $\leq$30 kN).

This will generally be the case when the maximum diameter of the drive shaft in the region of the self-aligning roller axial thrust bearing up to the double-action axial slip ring seal is 50 to 400 mm or 100 to 300 mm, its length is in the range from 1 to 3 m and the drive shaft itself and also the components secured thereon are manufactured essentially from stainless steel and the removal device is a circular rotating slotted bladed disk with a diameter in the range from 300 to 3000 mm.

The above-described inventive configuration of the mounting of the drive shaft is very particularly suitable when, in addition, the crystal melt consists of acrylic acid to an extent of at least 70% by weight, preferably to an extent of at least 80% by weight, or to an extent of at least 90% by weight, and acrylic acid is the chemical target compound. A useful double-action axial slip ring seal is especially an HSMR5L-D/250-E4 slip ring seal with additional leakage bore from Burgmann Industries/GmbH & Co in D-82502 Wolfratshausen. The slip ring and counter ring are manufactured from Buka 22 (SiC Q1 according to DIN 24960).

U.S. Provisional Patent Application No. 61/153,339, filed Feb. 18, 2009, is incorporated into the present patent application by literature reference.

With regard to the abovementioned teachings, numerous changes and deviations from the present invention are possible. It can therefore be assumed that the invention, within the scope of the appended claims, can be performed differently than the way described specifically herein.

The present invention thus comprises especially the following inventive embodiments:

1. A process for purifying removal of a chemical target compound from a suspension of crystals thereof in mother liquor with a wash apparatus which comprises, as at least one element, a wash column which consists of various components and has, as a first component, a fixed wall which encloses a process space which is rotationally symmetric with respect to its longitudinal axis and a crystal melt space which adjoins said process space, the angle α formed between the three-dimensional direction of the axis of symmetry and the vertical being not more than 20°, and the process space being delimited by the wall of the wash column and two opposite ends on the axis of symmetry, of which the higher end on the axis of symmetry constitutes the feed end and the lower end on the axis of symmetry the removal end, in which at the feed end, a stream of the suspension is conducted into the process space, while retaining the crystals to form a crystal bed in the process space from the suspension stream conducted into the process space, a mother liquor stream is released from the process space, as a further component of the wash column, a removal device rotates therein at the removal end of the process space, the crystal bed is conveyed within the process space with at least one force other than gravity and parallel to the axis of symmetry of the process space toward the rotating removal device to meet the removal device, the rotating removal device removes crystals from the crystal bed which meets it, the stream of the crystals removed flows through the rotating removal device and/or past the rotating removal device into the crystal melt space, which adjoins the process space beyond the removal device in conveying direction of the crystal bed, of the wash column, as a further component of the wash column, a drive shaft which is driven about its longitudinal axis by a drive unit for rotation is conducted into the wash column from below through an inlet leading into the crystal melt space, the angle β formed between the three-dimensional direction of the axis of rotation of the drive shaft and the three-dimensional direction of the axis of symmetry of the process space not being more than 20° in any projection of the two three-dimensional directions into one plane, the removal device is secured on the drive shaft and the rotating drive shaft transmits the torque required for the rotation of the removal device thereto, the crystal stream conducted into the crystal melt space is melted in the crystal melt space and/or in a melt circuit conducted through the crystal melt space by introducing heat to give a crystal melt stream, the inlet for the drive shaft into the crystal melt space is equipped with a seal which counteracts the unintended exit of crystal melt from the crystal melt space through the inlet into it, based on the strength of the aforementioned crystal melt stream, proceeding from the crystal melt space, a substream of crystal melt, as a wash melt stream, is conducted through the rotating removal device and/or past the rotating removal device against the direction of movement of the crystal bed into the process space so as to form, in the crystal bed, a wash front which divides the crystal bed into a mother liquor zone and into a wash melt zone, and the remaining substream is sent to its outlet as a pure melt stream of the chemical target compound, the force which acts on the drive shaft in the longitudinal direction thereof in normal operation of the process is always directed downward, the drive shaft is mounted so as to be rotatable about its longitudinal axis in more than one bearing, the mounting in one of the bearings is configured such that the mounting in this bearing absorbs the downward force acting on the drive shaft in the longitudinal direction thereof, and the mounting in at least two bearings is configured such that the mounting in each of these two bearings absorbs the forces acting radially outward from the drive shaft in the particular bearing of the two bearings, wherein the mounting in one of the bearings is additionally configured such that the mounting in this bearing is capable of absorbing an upward force acting on the drive shaft in the longitudinal direction thereof.

2. The process according to embodiment 1, wherein the weight of the total mass of the drive shaft and of all corotating components secured to it is $\geq 3$ kN.

3. The process according to embodiment 1, wherein the weight of the total mass of the drive shaft and of all corotating components secured to it is $\geq 8$ kN.

4. The process according to embodiment 1, wherein the weight of the total mass of the drive shaft and of all corotating components secured to it is $\geq 10$ kN.

5. The process according to any one of embodiments 1 to 4, wherein the weight of the total mass of the drive shaft and of all corotating components secured to it is $\leq 50$ kN.

6. The process according to any one of embodiments 1 to 4, wherein the weight of the total mass of the drive shaft and of all corotating components secured to it is $\leq 40$ kN.

7. The process according to any one of embodiments 1 to 4, wherein the weight of the total mass of the drive shaft and of all corotating components secured to it is $\leq 30$ kN.

8. The process according to any one of embodiments 1 to 7, wherein the angle α is not more than 20°.

9. The process according to any one of embodiments 1 to 7, wherein the angle α is not more than 5°.

10. The process according to any one of embodiments 1 to 7, wherein the angle α is 0°.

11. The process according to any one of embodiments 1 to 10, wherein the angle β is not more than 10°.

12. The process according to any one of embodiments 1 to 10, wherein the angle β is not more than 5°.

13. The process according to any one of embodiments 1 to 10, wherein the angle β is 0°.

14. The process according to any one of embodiments 1 to 13, wherein the difference between the temperature $T^{SCH}$ of the wash melt and the temperature $T^{SP}$ of the suspension fed to the process space is 1 to 25° C.

15. The process according to embodiment 14, wherein $T^{SCH}-T^{SP}$ is 2 to 20° C.

16. The process according to embodiment 14, wherein $T^{SCH}-T^{SP}$ is 5 to 15° C.

17. The process according to any one of embodiments 1 to 16, wherein the seal is a double-action axial slip ring seal.

18. The process according to any one of embodiments 1 to 17, wherein the drive shaft and the removal device are manufactured from materials whose density at 25° C. and 1 atm is $\geq 3$ g/cm$^3$ and $\leq 18$ g/cm$^3$.

19. The process according to embodiment 18, wherein the density of the materials is $\geq 5$ g/cm$^3$ and $\leq 18$ g/cm$^3$.

20. The process according to embodiment 18, wherein the density of the materials is $\geq 7$ g/cm$^3$ and $\leq 18$ g/cm$^3$.

21. The process according to any one of embodiments 1 to 20, wherein the densities of the crystal melt in the crystal melt space, of the mother liquor and of the crystal suspension in the process space are $\leq 1.5$ g/cm$^3$ and $\geq 0.7$ g/cm$^3$.

22. The process according to embodiment 21, wherein the density is $\leq 1.3$ g/cm$^3$ and $\geq 0.7$ g/cm$^3$.

23. The process according to any one of embodiments 1 to 22, wherein the orifice ratio of the removal device is $\geqq 0.05$ and $<1$.

24. The process according to embodiment 23, wherein the orifice ratio of the removal device is $\geqq 0.1$ and $\leqq 0.95$.

25. The process according to any one of embodiments 1 to 24, wherein the removal device has, on its side facing toward the crystal bed, at feast one removal blade, where the surface of the removal blade and the axis of rotation of the drive shaft form an acute angle γ.

26. The process according to embodiment 25, wherein the removal device is a disk having passage orifices, each passage orifice being equipped with a removal blade.

27. The process according to any one of embodiments 1 to 26, wherein the axis of rotation of the removal device and the axis of symmetry of the process space, based on the diameter of the process space averaged over the height of the process space, are offset laterally with respect to one another by less than 20%.

28. The process according to any one of embodiments 1 to 26, wherein the axis of rotation of the removal device and the axis of symmetry of the process space, based on the diameter of the process space averaged over the height of the process space, are offset laterally with respect to one another by less than 5%.

29. The process according to any one of embodiments 1 to 28, wherein the maximum diameter of the drive shaft in the longitudinal section thereof which is between the removal device and that bearing in which the mounting is configured such that it absorbs the downward force acting on the drive shaft in the longitudinal direction thereof is 50 mm to 400 mm.

30. The process according to any one of embodiments 1 to 28, wherein the maximum diameter of the drive shaft in the longitudinal section thereof which is between the removal device and that bearing in which the mounting is configured such that it absorbs the downward force acting on the drive shaft in the longitudinal direction thereof is 100 mm to 300 mm.

31. The process according to any one of embodiments 1 to 28, wherein the maximum diameter of the drive shaft in the longitudinal section thereof which is between the removal device and that bearing in which the mounting is configured such that it absorbs the downward force acting on the drive shaft in the longitudinal direction thereof is 150 mm to 250 mm.

32. The process according to any one of embodiments 1 to 31, wherein the content in the suspension conducted into the process space of the chemical target compound is $\geqq 70\%$ by weight.

33. The process according to any one of embodiments 1 to 31, wherein the content in the suspension conducted into the process space of the chemical target compound is $\geqq 80\%$ by weight.

34. The process according to any one of embodiments 1 to 31, wherein the content in the suspension conducted into the process space of the chemical target compound is $\geqq 90\%$ by weight.

35. The process according to any one of embodiments 1 to 34, wherein the degree of crystallization of the suspension conducted into the process space is 0.10 to 0.60.

36. The process according to any one of embodiments 1 to 34, wherein the degree of crystallization of the suspension conducted into the process space is 0.20 to 0.40.

37. The process according to any one of embodiments 1 to 36, wherein the chemical target compound is a compound from the group consisting of acrylic acid, methacrylic acid, N-vinylpyrrolidone and p-xylene.

38. The process according to any one of embodiments 1 to 37, wherein the chemical target compound is acrylic acid and the suspension fed to the process space comprises $\geqq 65\%$ by weight of acrylic acid and 0.1 to 30% by weight of water.

39. The process according to any one of embodiments 1 to 37, wherein the chemical target compound is acrylic acid and the suspension fed to the process space comprises $\geqq 80\%$ by weight of acrylic acid and 0.5 to 15% by weight of water.

40. The process according to any one of embodiments 1 to 37, wherein the chemical target compound is acrylic acid and the suspension fed to the process space comprises $\geqq 90\%$ by weight of acrylic acid and 0.7 to 9% by weight of water.

41. The process according to any one of embodiments 1 to 40, wherein that mounting in the at least two bearings which is configured such that it absorbs the downward force acting on the drive shaft in the longitudinal direction thereof is configured such that it is capable of absorbing downward forces acting on the drive shaft in the longitudinal direction thereof which are $\geqq 50$ kN.

42. The process according to any one of embodiments 1 to 40, wherein that mounting in the at least two bearings which is configured such that it absorbs the downward force acting on the drive shaft in the longitudinal direction thereof is configured such that it is capable of absorbing downward forces acting on the drive shaft in the longitudinal direction thereof which are $\geqq 100$ kN.

43. The process according to any one of embodiments 1 to 42, wherein that mounting in the at least two bearings which is configured such that it is capable of absorbing an upward force acting on the drive shaft in the longitudinal direction thereof is configured such that it is capable of absorbing upward forces acting on the drive shaft in the longitudinal direction thereof which are $\geqq 50$ kN.

44. The process according to any one of embodiments 1 to 42, wherein that mounting in the at least two bearings which is configured such that it is capable of absorbing an upward force acting on the drive shaft in the longitudinal direction thereof is configured such that it is capable of absorbing upward forces acting on the drive shaft in the longitudinal shaft thereof which are $\geqq 75$ kN.

45. The process according to any one of embodiments 1 to 44, wherein the drive shaft is mounted so as to be rotatable in at least two bearings, the mounting in a first bearing being configured as a guide mounting which absorbs both the downward force acting on the drive shaft in the longitudinal direction thereof and the forces acting radially outward from the drive shaft in the first bearing, and is additionally capable of absorbing an upward force acting on the drive shaft in the longitudinal direction thereof, and in a second bearing as a radial mounting which absorbs only the forces acting radially outward from the drive shaft in this second bearing.

46. The process according to embodiment 45, wherein the first bearing is an angular contact ball bearing, a self-aligning ball bearing or a self-aligning roller bearing.

47. The process according to embodiment 45 or 46, wherein the second bearing is a deep groove ball bearing or a self-aligning roller bearing.

48. The process according to any one of embodiments 45 to 47, wherein the mounting of the drive shaft in the second bearing is configured above the mounting of the drive shaft in the first bearing.

49. The process according to any one of embodiments 45 to 48, wherein all mountings are configured below the inlet of the drive shaft into the crystal melt space.
50. The process according to any one of embodiments 1 to 44, wherein the drive shaft is mounted so as to be rotatable in at least three bearings, the mounting in a first bearing being configured as a support mounting which absorbs both the downward force acting on the drive shaft in the longitudinal direction thereof and the forces acting radially outward from the drive shaft in the first bearing, in a second bearing likewise as a support mounting which both absorbs the forces acting radially outward from the drive shaft in the second bearing and is capable of absorbing an upward force acting on the drive shaft in the longitudinal direction thereof, and in a third bearing as a radial mounting which absorbs only the forces acting radially outward from the drive shaft in this third bearing.
51. The process according to embodiment 50, wherein the first bearing is a self-aligning roller axial thrust bearing.
52. The process according to embodiment 50 or 51, wherein the second bearing is a self-aligning roller bearing.
53. The process according to any one of embodiments 50 to 52, wherein the third bearing is a self-aligning roller bearing.
54. The process according to any one of embodiments 50 to 53, wherein the mounting of the drive shaft in the first bearing is configured below the mounting in the second bearing which is configured below the mounting in the third bearing.
55. The process according to any one of embodiments 50 to 54, wherein all mountings are configured below the inlet of the drive shaft into the crystal melt space.
56. The process according to any one of embodiments 1 to 55, wherein the third bearing including the mounting therein is dispensed with.
57. The process according to any one of embodiments 1 to 56, wherein the removal device, on its side facing toward the crystal bed, has at least one removal blade, where the surface of the removal blade and the axis of rotation of the drive shaft form an angle γ for which 20°≦γ≦70°.
58. The process according to any one of embodiments 1 to 56, wherein the removal device, on its side facing toward the crystal bed, has at least one removal blade, where the surface of the removal blade and the axis of rotation of the drive shaft form an angle γ for which 30°≦γ≦60°.
59. The process according to any one of embodiments 1 to 58, wherein the majority of the crystals in the suspension have a longest dimension in the range of 50 to 1500 μm.
60. The process according to any one of embodiments 1 to 59, wherein the seal is a double-action axial slip ring seal which comprises two slip ring pairs.
61. The process according to embodiment 60, wherein the upper slip ring pair is in the open in the crystal melt.

FIG. 7 shows, by way of example, a deep groove axial thrust bearing (a sandwich roller bearing). The numerical addresses here have the following meanings:
54: upper washer;
55: lower washer;
56: roller body.

FIG. 8 shows, by way of example, a self-aligning roller bearing (concentric rings). The new numerical addresses here have the following meanings:

57: outer ring;
58: inner ring.

Figure 9:
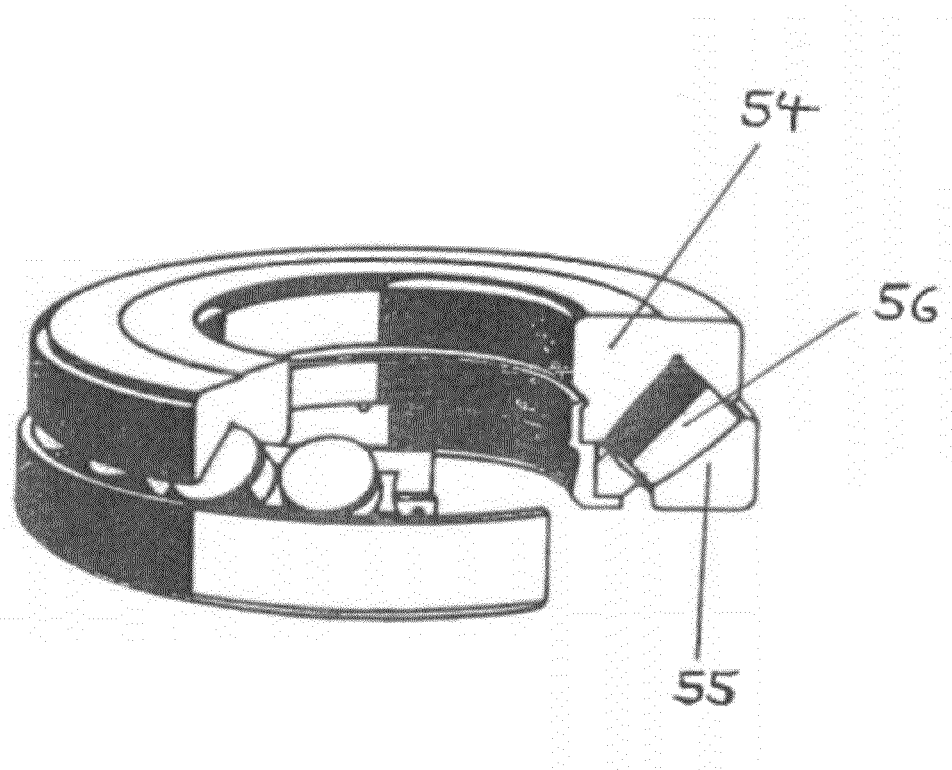
FIG. 9 shows a self-aligning roller axial thrust bearing.

FIG. 9 shows, by way of example, a self-aligning roller axial thrust bearing.

EXAMPLES

The wash column used was a hydraulic wash column according to FIG. 2 of EP-B 1448282. The length of the process space was 1500 mm. It comprised 54 filter tubes with an external diameter of 48.3 mm and an internal diameter of 38.3 mm, and a central circular cylindrical displacer of diameter 350 mm. The length of the filter tubes was (in order to ensure spacing thereof from the removal device) 1497 mm (including 250 mm displacer section), and the length of the filters (around the entire tube circumference) integrated therein was 70 mm. The cross section of the process space over its length was essentially 1.54 m². The arrangement of the filter tubes and of the central displacer followed FIG. 3 of EP-B 1448282. The filters were installed after a tube length of 1177 mm (measured from the top) (the filter openings were 250 to 300 μm). The removal device used was a slotted bladed disk according to FIG. 5 of EP-B 1448282. It had a total of eighteen (18) slots (on the inner ring were six (6) and on the outer ring were twelve (12)), which had a homogeneous elongated hole geometry. The separation of the two hole centers was 275 mm, and the hole diameter was 55 mm. The disk thickness (the slot height) was 50 mm (calculated up to maximum profile height). The diameter of the bladed disk was 1468 mm. Each elongated hole slot was, according to FIG. 5 of EP-A 1448282, equipped with a removal blade (the thickness of the blade back was approx. 15 mm). The length of the blade was 272 mm, the angle γ was 40° and the particular blade projected by 3 mm above the surface of the slotted bladed disk facing the crystal bed (this neglects the profile thereof, i.e. the figure is based on the highest point of the profile). The surface of the bladed disk facing the crystal bed was also provided with a profile composed of concentric grooves (the groove cross section was triangular; the groove depth was 5 mm, the groove width was 13.5 mm and successive grooves in radial direction each possessed a common vertex).

The bladed disk rotated at eight (8) revolutions per minute counterclockwise (viewing the bladed disk from above). The wash column body was held by a supporting ring and was enclosed with thermal insulation material as in the working example of German application 102008040340.7 and in the example of DE-A 10 2007 004 960. Otherwise, the wash column apparatus corresponded to the unit shown in FIGS. 5 and 6 and described in detail in the description of this document. The entire wash apparatus was accommodated in a heated housing, as described in the working example of German application 102008040340.7 and in the example of DE A 10 2007 004 960. The flows were controlled as described in DE-A 102005018702 and WO 2006/111565. All components of the wash column apparatus were essentially manufactured from stainless steel. The maximum diameter of the drive shaft in the length region between the lowermost support mounting and the double-action axial slip ring seal was 220 mm. The length of the drive shaft was 2.5 m. The drive shaft led up to the removal device. From the top downward, the radial mounting was mounted after 900 mm, the first support mounting after 1300 mm and the second support mounting after 1480 mm. α and β were both approx. 0°. The weight of the total mass of the drive shaft and of the components secured thereon was 14.6 kN. The bearings used were those named individually in the description with reference to FIG. 6.

The crystal suspension fed to the process space via the distributor space present above it (as depicted in FIG. 2 of EP-B 1448282) was a suspension of acrylic acid crystals in mother liquor. The crystal bed was conveyed from the top downward. The crystal suspension was prepared as described in DE-A 102007043748 and in DE-A 102007004960. The degree of crystallization was approx. 0.28. The acrylic acid content of the crystal suspension was about 93 to 95% by weight. The water content of the crystal suspension was 3 to 5% by weight (based in each case on the total weight of the crystal suspension). The crystal suspension was polymerization inhibited with phenothiazine (PTZ), the monomethyl ether of hydroquinone (MEHQ) and molecular oxygen. The longest dimension of the acrylic acid crystals was in the range from 200 to 800 µm. The crystal suspension was supplied by means of a centrifugal pump (closed impeller type), and the quantitative control was effected by means of speed regulation of the pump. The control flow pump was likewise configured as a centrifugal pump with a regulating valve. The control liquid used was recycled removed mother liquor. The control flow rate employed to regulate the wash column was 8 to 30 t/h. In some cases, it was possible to operate the wash column without a control stream when the liquid flow rate supplied with the suspension was already sufficient for the transport of the crystal bed. The ratio of effective transport pressure difference to effective wash pressure difference was 1.5±0.3. The circulation flow rate in the melt circuit was 10 to 15 m³/h based on a stream of removed crystals of 1 t/h. The temperature in the melt circuit was 13 to 16° C. The polymerization inhibition of the melt circuit was effected with MEHQ as described in DE-A 102007004960 (the PTZ content was below the detection limit). In addition, air was introduced into the melt circuit, the excess of which (equals proportion not dissolved in the crystal melt) was removed via a gas separator before the recycling into the crystal melt space. The buildup front was detected according to DE-A 102005018702 by means of two pressure drop measurements over different crystal bed lengths, which were put into a ratio relative to one another. The wash front was regulated by means of temperature measurement in the crystal bed. The stream of crystal suspension (reported as pure crystal stream) supplied was (depending on the product demand) 5-6 t/h (low-load operation) or 12-13 t/h (high-load operation). Its temperature varied within the range from 6 to 9° C. The total height of the crystal bed (up to the buildup front) was usually in the range from 600 to 1100 mm.

The wash front was 100 to 200 (usually approx. 150) mm above the slotted bladed disk. The melt circuit pump used was a centrifugal pump with product-side flushing of the shaft seal (slip ring seal; double configuration, with barrier medium cooled to 15 to 30° C. (mixture of water (65% by weight) and ethylene glycol (35% by weight); this barrier medium was also used in the barrier space of the double-action axial slip ring seal at the inlet into the crystal melt space). From the outlet of the melt circuit, 5-6 t/h (low-load operation) or 12-13 t/h (high-load operation) of a glacial acrylic acid melt were withdrawn, whose acrylic acid content was 99.8% by weight. The degree of recrystallization varied within the range of 95-100%.

The process was operated without disruption over an operating time of 6 months.

Comparative Example

The procedure was as in the example, but with the difference that the second support mounting was configured only as a radial mounting (the support washer 48 was not extended in the downward direction up to the outer ring of the first self-aligning roller bearing). Within an operating time of 6 months, two leaks of the double-action axial slip ring seal occurred at the inlet into the crystal melt space (the leaks became noticeable as a result of barrier fluid losses and acrylic acid penetrating into the barrier space).

The invention claimed is:

1. A process for purifying removal of a chemical target compound from a suspension of crystals thereof in mother liquor with a wash apparatus which comprises, as at least one element, a wash column which comprises various components and has, as a first component, a fixed wall which encloses a process space which is rotationally symmetric with respect to its longitudinal axis and a crystal melt space which adjoins said process space, the angle $\alpha$ formed between the three-dimensional direction of the axis of symmetry and the vertical being not more than 20°, and the process space being delimited by the wall of the wash column and two opposite ends on the axis of symmetry, of which the higher end on the axis of symmetry constitutes the feed end and the lower end on the axis of symmetry the removal end, as a further component of the wash column, a removal device rotates therein at the removal end of the process space, as a further component of the wash column, a drive shaft which is driven about its longitudinal axis by a drive unit for rotation is conducted into the wash column from below through an inlet leading into the crystal melt space, the angle $\beta$ formed between the three-dimensional direction of the axis of rotation of the drive shaft and the three-dimensional direction of the axis of symmetry of the process space not being more than 20° in any projection of the two three-dimensional directions into one plane, the removal device is secured on the drive shaft and the rotating drive shaft transmits the torque required for the rotation of the removal device thereto, the inlet for the drive shaft into the crystal melt space is equipped with a seal which counteracts the unintended exit of crystal melt from the crystal melt space through the inlet into it, the force which acts on the drive shaft in the longitudinal direction thereof in normal operation of the process is always directed downward, the drive shaft is mounted so as to be rotatable about its longitudinal axis in more than one bearing, the mounting in one of the bearings is configured such that the mounting in this bearing absorbs the downward force acting on the drive shaft in the longitudinal direction thereof, and the mounting in at least two bearings is configured such that the mounting in each of these two bearings absorbs the forces acting radially outward from the drive shaft in the particular bearing of the two bearings, which process comprises:

at the feed end, a stream of the suspension is conducted into the process space, while retaining the crystals to form a crystal bed in the process space from the suspension stream conducted into the process space, a mother liquor stream is released from the process space, the crystal bed is conveyed within the process space with at least one force other than gravity and parallel to the axis of symmetry of the process space toward the rotating removal device to meet the removal device, the rotating removal device removes crystals from the crystal bed which meets it, the stream of the crystals removed flows through the rotating removal device and/or past the rotating removal device into the crystal melt space, which adjoins the process space beyond the removal device in conveying direction of the crystal bed, of the wash column, the crystal stream conducted into the crystal melt space is melted in the crystal melt space and/or in a melt circuit conducted through the crystal melt space by introducing heat to give a crystal melt stream, based on the strength of the aforementioned crystal melt stream, proceeding from the crystal melt space, a substream of crystal melt, as a wash melt stream, is conducted through the rotating removal device and/or past the rotating removal device against the direction of movement of the crystal bed into the process space so as to form, in the crystal bed, a wash front which divides the crystal bed into a mother liquor zone and into a wash melt zone, and the remaining substream is sent to its outlet as a pure melt stream of the chemical target compound, wherein additionally the mounting in one of the bearings is configured such that the mounting in this bearing is capable of absorbing an upward force acting on the drive shaft in the longitudinal direction thereof which is $\geq 50$ kN.

2. The process according to claim 1, wherein the weight of the total mass of the drive shaft and of all corotating components secured to it is $\geq 3$ kN.

3. The process according to claim 1 or 2, wherein the weight of the total mass of the drive shaft and of all corotating components secured to it is $\leq 50$ kN.

4. The process according to claim 1 or 2, wherein the angle $\alpha$ is not more than 20°.

5. The process according to claim 1 or 2, wherein the angle $\beta$ is not more than 10°.

6. The process according to claim 1 or 2, wherein the difference between the temperature $T^{SCH}$ of the wash melt and the temperature $T^{SP}$ of the suspension fed to the process space is 1 to 25° C.

7. The process according to claim 1 or 2, wherein the seal is a double-action axial slip ring seal.

8. The process according to claim 1 or 2, wherein the drive shaft and the removal device are manufactured from materials whose density at 25° C. and 1 atm is $\geq 3$ g/cm$^3$ and $\leq 18$ g/cm$^3$.

9. The process according to claim 1 or 2, wherein the density of the crystal melt in the crystal melt space, of the mother liquor and of the crystal suspension in the process space is $\leq 1.5$ g/cm$^3$ and $\geq 0.7$ g/cm$^3$.

10. The process according to claim 1 or 2, wherein the orifice ratio of the removal device is $\geq 0.05$ and $<1$.

11. The process according to claim 1 or 2, wherein the removal device has, on its side facing toward the crystal bed, at least one removal blade, where the surface of the removal blade and the axis of rotation of the drive shaft form an acute angle $\gamma$.

12. The process according to claim 11, wherein the removal device is a disk having passage orifices, each passage orifice being equipped with a removal blade.

13. The process according to claim 1 or 2, wherein the maximum diameter of the drive shaft in the longitudinal section thereof which is between the removal device and that bearing in which the mounting is configured such that it absorbs the downward force acting on the drive shaft in the longitudinal direction thereof is 50 mm to 400 mm.

14. The process according to claim 1 or 2, wherein the content in the suspension conducted into the process space of the chemical target compound is $\geq 70\%$ by weight.

15. The process according to claim 1 or 2, wherein the degree of crystallization of the suspension conducted into the process space is 0.10 to 0.60.

16. The process according to claim 1 or 2, wherein the chemical target compound is a compound selected from the group consisting of acrylic acid, methacrylic acid, N-vinylpyrrolidone and p-xylene.

17. The process according to claim 1 or 2, wherein the chemical target compound is acrylic acid and the suspension fed to the process space comprises $\geq 65\%$ by weight of acrylic acid and 0.1 to 30% by weight of water.

18. The process according to claim 1 or 2, wherein that mounting in the at least two bearings which is configured such that it absorbs the downward force acting on the drive shaft in the longitudinal direction thereof is configured such that it is capable of absorbing downward forces acting on the drive shaft in the longitudinal direction thereof which are $\geq 50$ kN.

19. The process according to claim 1 or 2, wherein the drive shaft is mounted so as to be rotatable in at least two bearings, the mounting in a first bearing being configured as a guide mounting which absorbs both the downward force acting on the drive shaft in the longitudinal direction thereof and the forces acting radially outward from the drive shaft in the first bearing, and is additionally capable of absorbing an upward force acting on the drive shaft in the longitudinal direction thereof, and in a second bearing as a radial mounting which absorbs only the forces acting radially outward from the drive shaft in this second bearing.

20. The process according to claim 1 or 2, wherein the drive shaft is mounted so as to be rotatable in at least three bearings, the mounting in a first bearing being configured as a support mounting which absorbs both the downward force acting on the drive shaft in the longitudinal direction thereof and the forces acting radially outward from the drive shaft in the first bearing, in a second bearing likewise as a support mounting which both absorbs the forces acting radially outward from the drive shaft in the second bearing and is capable of absorbing an upward force acting on the drive shaft in the longitudinal direction thereof, and in a third bearing as a radial mounting which absorbs only the forces acting radially outward from the drive shaft in this third bearing.

21. The process according to claim 1, wherein the weight of the total mass of the drive shaft and of all corotating components secured to it is $\geq 3$ kN and $\leq 50$ kN, the maximum diameter of the drive shaft in the longitudinal section thereof which is between the removal device and that bearing in which the mounting is configured such that it absorbs the downward force acting on the drive shaft in the longitudinal direction thereof is 50 mm to 400 mm, the chemical target compound is acrylic acid and the suspension fed to the process space comprises $\geq 65\%$ by weight of acrylic acid and 0.1 to 30% by weight of water, and that mounting in the at least two bearings which is configured such that it absorbs the downward force acting on the drive shaft in the longitudinal direction thereof is configured such that it is capable of absorbing downward forces acting on the drive shaft in the longitudinal direction thereof which are $\geq 50$ kN.

* * * * *